US007904293B2

(12) United States Patent
Wang et al.

(10) Patent No.: US 7,904,293 B2
(45) Date of Patent: Mar. 8, 2011

(54) SUB-BAND VOICE CODEC WITH MULTI-STAGE CODEBOOKS AND REDUNDANT CODING

(75) Inventors: Tian Wang, Redmond, WA (US); Kazuhito Koishida, Redmond, WA (US); Hosam A. Khalil, Redmond, WA (US); Xiaoqin Sun, Redmond, WA (US); Wei-Ge Chen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 121 days.

(21) Appl. No.: 11/973,689

(22) Filed: Oct. 9, 2007

(65) Prior Publication Data

US 2008/0040105 A1 Feb. 14, 2008

Related U.S. Application Data

(63) Continuation of application No. 11/197,914, filed on Aug. 4, 2005, now Pat. No. 7,280,960, which is a continuation of application No. 11/142,605, filed on May 31, 2005, now Pat. No. 7,177,804.

(51) Int. Cl.
*G10L 15/00* (2006.01)

(52) U.S. Cl. .......................... 704/222; 704/223; 704/229

(58) Field of Classification Search .................. 704/222, 704/223, 229, 2

See application file for complete search history.

(56) References Cited

U.S. PATENT DOCUMENTS

| | | | |
|---|---|---|---|
| 4,802,171 | A | 1/1989 | Rasky |
| 4,815,134 | A | 3/1989 | Picone et al. |
| 4,969,192 | A | 11/1990 | Chen et al. |
| 5,255,339 | A | 10/1993 | Fette et al. |
| 5,394,473 | A | 2/1995 | Davidson |
| 5,615,298 | A | 3/1997 | Chen |
| 5,664,051 | A | 9/1997 | Hardwick et al. |
| 5,664,055 | A | 9/1997 | Kroon |
| 5,668,925 | A | 9/1997 | Rothweiler et al. |
| 5,699,477 | A | 12/1997 | McCree |
| 5,699,485 | A | 12/1997 | Shoham |
| 5,717,823 | A | 2/1998 | Kleijn |
| 5,724,433 | A | 3/1998 | Engebretson et al. |
| 5,734,789 | A | 3/1998 | Swaminathan et al. |
| 5,737,484 | A | 4/1998 | Ozawa |

(Continued)

FOREIGN PATENT DOCUMENTS

CA 1336454 7/1995

(Continued)

OTHER PUBLICATIONS

European Search Report for PCT/US06/12686 dated Aug. 13, 2008, 8 pages.

(Continued)

*Primary Examiner* — Daniel D Abebe
(74) *Attorney, Agent, or Firm* — Klarquist Sparkman, LLP

(57) ABSTRACT

Techniques and tools related to coding and decoding of audio information are described. For example, redundant coded information for decoding a current frame includes signal history information associated with only a portion of a previous frame. As another example, redundant coded information for decoding a coded unit includes parameters for a codebook stage to be used in decoding the current coded unit only if the previous coded unit is not available. As yet another example, coded audio units each include a field indicating whether the coded unit includes main encoded information representing a segment of an audio signal, and whether the coded unit includes redundant coded information for use in decoding main encoded information.

16 Claims, 12 Drawing Sheets

U.S. PATENT DOCUMENTS

| | | | | |
|---|---|---|---|---|
| 5,751,903 | A | 5/1998 | Swaminathan et al. | |
| 5,778,335 | A | 7/1998 | Ubale et al. | |
| 5,819,212 | A | 10/1998 | Matsumoto et al. | |
| 5,819,213 | A * | 10/1998 | Oshikiri et al. | 704/222 |
| 5,819,298 | A | 10/1998 | Wong et al. | |
| 5,835,495 | A | 11/1998 | Ferriere | |
| 5,845,244 | A | 12/1998 | Proust | |
| 5,870,412 | A | 2/1999 | Schuster et al. | |
| 5,873,060 | A | 2/1999 | Ozawa | |
| 5,890,108 | A | 3/1999 | Yeldener | |
| 6,009,122 | A | 12/1999 | Chow | |
| 6,029,126 | A | 2/2000 | Malvar | |
| 6,041,345 | A | 3/2000 | Levi et al. | |
| 6,064,962 | A * | 5/2000 | Oshikiri et al. | 704/262 |
| 6,108,626 | A | 8/2000 | Cellario et al. | |
| 6,122,607 | A | 9/2000 | Ekudden et al. | |
| 6,128,349 | A | 10/2000 | Chow | |
| 6,134,518 | A | 10/2000 | Cohen et al. | |
| 6,199,037 | B1 | 3/2001 | Hardwick | |
| 6,202,045 | B1 | 3/2001 | Ojala et al. | |
| 6,226,606 | B1 | 5/2001 | Acero | |
| 6,240,387 | B1 | 5/2001 | DeJaco | |
| 6,263,312 | B1 | 7/2001 | Kolesnik et al. | |
| 6,289,297 | B1 | 9/2001 | Bahl | |
| 6,292,834 | B1 | 9/2001 | Ravi et al. | |
| 6,310,915 | B1 | 10/2001 | Wells et al. | |
| 6,311,154 | B1 | 10/2001 | Gersho et al. | |
| 6,317,714 | B1 | 11/2001 | Del Castillo et al. | |
| 6,330,533 | B2 | 12/2001 | Su et al. | |
| 6,351,730 | B2 | 2/2002 | Chen | |
| 6,377,915 | B1 | 4/2002 | Sasaki | |
| 6,385,573 | B1 | 5/2002 | Gao et al. | |
| 6,392,705 | B1 | 5/2002 | Chaddha | |
| 6,408,033 | B1 | 6/2002 | Chow | |
| 6,434,247 | B1 | 8/2002 | Kates et al. | |
| 6,438,136 | B1 | 8/2002 | Bahl | |
| 6,460,153 | B1 | 10/2002 | Chou et al. | |
| 6,493,665 | B1 | 12/2002 | Su et al. | |
| 6,499,060 | B1 | 12/2002 | Wang et al. | |
| 6,505,152 | B1 | 1/2003 | Acero | |
| 6,564,183 | B1 * | 5/2003 | Hagen et al. | 704/214 |
| 6,614,370 | B2 | 9/2003 | Gottesman | |
| 6,621,935 | B1 | 9/2003 | Xin et al. | |
| 6,633,841 | B1 | 10/2003 | Thyssen et al. | |
| 6,647,063 | B1 | 11/2003 | Oikawa | |
| 6,647,366 | B2 | 11/2003 | Wang et al. | |
| 6,658,383 | B2 | 12/2003 | Koishida et al. | |
| 6,693,964 | B1 | 2/2004 | Zhang et al. | |
| 6,721,337 | B1 | 4/2004 | Kroeger et al. | |
| 6,732,070 | B1 | 5/2004 | Rotola-Pukkila et al. | |
| 6,757,654 | B1 | 6/2004 | Westerlund et al. | |
| 6,772,126 | B1 * | 8/2004 | Simpson et al. | 704/500 |
| 6,775,649 | B1 | 8/2004 | DeMartin | |
| 6,823,303 | B1 | 11/2004 | Su et al. | |
| 6,826,527 | B1 | 11/2004 | Unno | |
| 6,934,678 | B1 * | 8/2005 | Yang | 704/221 |
| 6,952,668 | B1 | 10/2005 | Kapilow | |
| 6,968,309 | B1 | 11/2005 | Makinen et al. | |
| 7,002,913 | B2 | 2/2006 | Huang et al. | |
| 7,003,448 | B1 | 2/2006 | Lauber et al. | |
| 7,065,338 | B2 | 6/2006 | Mano et al. | |
| 7,072,832 | B1 * | 7/2006 | Su et al. | 704/230 |
| 7,117,156 | B1 | 10/2006 | Kapilow | |
| 7,246,037 | B2 | 7/2007 | Evans | |
| 7,356,748 | B2 | 4/2008 | Taleb | |
| 2001/0023395 | A1 | 9/2001 | Su et al. | |
| 2002/0016711 | A1 * | 2/2002 | Manjunath et al. | 704/258 |
| 2002/0072901 | A1 | 6/2002 | Bruhn | |
| 2002/0097807 | A1 | 7/2002 | Gerrits | |
| 2002/0159472 | A1 | 10/2002 | Bialik | |
| 2003/0004718 | A1 | 1/2003 | Rao | |
| 2003/0009326 | A1 | 1/2003 | Wang et al. | |
| 2003/0016630 | A1 | 1/2003 | Vega-Garcia et al. | |
| 2003/0072276 | A1 | 4/2003 | DiFazio et al. | |
| 2003/0072464 | A1 | 4/2003 | Kates | |
| 2003/0088406 | A1 | 5/2003 | Chen et al. | |
| 2003/0088408 | A1 | 5/2003 | Thyssen et al. | |
| 2003/0101050 | A1 | 5/2003 | Khalil et al. | |
| 2003/0115050 | A1 | 6/2003 | Chen et al. | |
| 2003/0115051 | A1 | 6/2003 | Chen et al. | |
| 2003/0135631 | A1 | 7/2003 | Li et al. | |
| 2005/0075869 | A1 | 4/2005 | Gersho et al. | |
| 2005/0154584 | A1 | 7/2005 | Jelinek et al. | |
| 2005/0165603 | A1 * | 7/2005 | Bessette et al. | 704/200.1 |
| 2005/0228651 | A1 | 10/2005 | Wang et al. | |
| 2005/0267753 | A1 * | 12/2005 | Yang | 704/251 |
| 2005/0281345 | A1 | 12/2005 | Obernosterer et al. | |
| 2006/0271354 | A1 * | 11/2006 | Sun et al. | 704/205 |
| 2006/0271355 | A1 | 11/2006 | Wang et al. | |
| 2006/0271357 | A1 | 11/2006 | Wang et al. | |
| 2006/0271359 | A1 | 11/2006 | Khalil et al. | |
| 2006/0271373 | A1 | 11/2006 | Khalil et al. | |
| 2007/0088543 | A1 * | 4/2007 | Ehara | 704/223 |
| 2007/0088558 | A1 | 4/2007 | Vos et al. | |
| 2007/0255558 | A1 * | 11/2007 | Yasunaga et al. | 704/222 |
| 2007/0255559 | A1 * | 11/2007 | Gao et al. | 704/225 |
| 2008/0232612 | A1 | 9/2008 | Tourwe | |
| 2009/0182558 | A1 * | 7/2009 | Su et al. | 704/230 |

FOREIGN PATENT DOCUMENTS

| | | |
|---|---|---|
| EP | 0 503 684 | 9/1992 |
| EP | 0 747 882 | 12/1996 |
| FR | 2 784 218 | 4/2000 |
| GB | 2 324 689 | 10/1989 |
| JP | 1013200 | 1/1989 |
| JP | 07-297726 | 11/1995 |
| JP | 08-263098 | 10/1996 |
| JP | 10-133695 | 5/1998 |
| JP | 10-340098 | 12/1998 |
| JP | 2000-132194 | 5/2000 |
| JP | 2002-118517 | 4/2002 |
| WO | WO 98 27543 | 6/1998 |
| WO | WO 00 63882 | 10/2000 |
| WO | WO 00 68934 | 11/2000 |
| WO | WO 01 93516 | 12/2001 |
| WO | WO 00 11655 | 3/2002 |
| WO | WO 02 37475 | 5/2002 |
| WO | WO 03 102921 | 12/2003 |

OTHER PUBLICATIONS

International Search Report and Written Opinion for PCT/US06/12641.

Andersen et al., "ILBC—a Linear Predictive Coder with Robustness to Packet Losses," Proc. IEEE Workshop on Speech Coding, 2002, pp. 23-25 (2002).

B. Bessette, R. Salami, C. Laflamme and R. Lefebvre, "A Wideband Speech and Audio Codec at 16/24/32 kbit/s using Hybrid ACELP/TCX Techniques," in Proc. IEEE Workshop on Speech Coding, pp. 7-9, 1999.

Chen et al., "Adaptive Postfiltering for Quality Enhancement of Coded Speech," IEEE Transactions on Speech and Audio Processing, vol. 3, No. 1, pp. 59-71 (1995).

J-H. Chen and D. Wang, "Transform Predictive Coding of Wideband Speech Signals," in Proc. International Conference on Acoustic, Speech, Signal Processing, pp. 275-278, 1996.

Combescure, P., et al., "A16, 24, 32 kbit/s Wideband Speech Codec Based on ATCELP," *In Proceedings of IEEE International Conference on Acoustics, Speech, and Signal Processing*, vol. 1, pp. 5-8 (Mar. 1999).

El Maleh, K., et al., "Speech/Music Discrimination for Multimedia Applications," *In Proceedings of IEEE International Conference on Acoustics, Speech, and Signal Processing*, vol. 4, pp. 2445-2448, (Jun. 2000).

Ellis, D., et al. "Speech/Music Discrimination Based on Posterior Probability Features," *In Proceedings of Eurospeech*, 4 pages, Budapest (1999).

Erdmann et al., "An Adaptive Multi Rate Wideband Speech Codec with Adaptive Gain Re-quantization," Proc. IEEE Workshop on Speech Coding, 2000, pp. 145-147 (2000).

Erhart et al., "A speech packet recovery technique using a model based tree search interpolator," Proc. 1993 IEEE Workshop on Speech Coding for Telecommunications, pp. 77-78 (1993).
Feldbauer et al., "Speech Coding Using Motion Picture Compression Techniques," Proc. IEEE Workshop on Speech Coding, 2002, pp. 47-49 (2002).
Fingscheidt et al., "Joint Speech Codec Parameter and Channel Decoding of Parameter Individual Block Codes (PIBC)," Proc. 1999 IEEE Workshop on Speech Coding, pp. 75-77 (1999).
Fout, "Media Support in the Microsoft Windows Real-Time Communications Client," 6 pp. [Downloaded from the World Wide Web on Feb. 26, 2004.].
Gersho, A., "Advances in Speech and Audio Compression", *Proceedings of the IEEE*, vol. 82(6):900-918 (Jun. 1994).
Gersho, A., et al., "Vector Quantization and Signal Compression", Dordrecht, Netherlands,: Kluwer *Academic Publishers*, 1992, xxii+732pp.
Gerson et al., "Vector Sum Excited Linear Prediction (VSELP) Speech Coding at 8 KBPS," CH2847-2/90/0000-0461 IEEE, pp. 461-464 (1990).
Hardwick, J.C.; Lim, J.S., "A 4.8 KBPS Multi-Brand Excitation Speech Coder", *ICASSP 1988 International Conference on Acoustics, Speech, and Signal*, New York, NY, USA, Apr. 11-14, 1988,: *IEEE*, vol. 1, pp. 374-377.
Heinen et al., "Robust Speech Transmission Over Noisy Channels Employing Non-linear Block Codes," Proc. 1999 IEEE Workshop on Speech Coding, pp. 72-74 (1999).
Houtgast, T., et al., "The Modulation Transfer Function in Room Acoustics As A Predictor or Speech Intelligibility," *Acustica*, vol. 23, pp. 66-73 (1973).
Ikeda et al., "Error-Protected TwinVQ Audio Coding at Less Than 64 kbit/s/ch," Proc. 1995 IEEE Workshop on Speech Coding for Telecommunications, pp. 33-34 (1995).
ITU-T, G.722.1 (Sep. 1999), Series G: Transmission Systems and Media, Digital Systems and Networks, Coding at 24 and 32 kbit/s for hands-free operation in systems with low frame loss.
ITU-T, "ITU-T Recommendation G.722, General Aspects of Digital Transmission Systems—Terminal Equipments 7 kHz Audio—Coding within 64 kbit/s," 75 pp. (1988).
ITU-T, "ITU-T Recommendation G.722.1, Series G: Transmission Systems and Media, Digital Systems and Networks. Digital terminal equipments—Coding of analogue signals by methods other than PCM—Coding at 24 and 32 kbit/s for hands-free operation in systems with low frame loss," 26 pp. (1999).
ITU-T, "ITU-T Recommendation G.722.1—Corrigendum 1, Series G: Transmission Systems and Media, Digital Systems and Networks. Digital terminal equipments—Coding of analogue signals by methods other than PCM—Coding at 24 and 32 kbit/s for hands-free operation in systems with low frame loss," 9 pp. (2000).
ITU-T, "ITU-T Recommendation G.722.1 Annex A, Series G: Transmission Systems and Media, Digital Systems and Networks. Digital terminal equipments—Coding of analogue signals by methods other than PCM—Coding at 24 and 32 kbit/s for hands-free operation in systems with low frame loss, Annex A: Packet format, capability identifiers and capability parameters" 9 pp. (2000).
ITU-T, "ITU-T Recommendation G.722.1 Annex B, Series G: Transmission Systems and Media, Digital Systems and Networks. Digital terminal equipments—Coding of analogue signals by methods other than PCM—Coding at 24 and 32 kbit/s for hands-free operation in systems with low frame loss, Annex B: Floating-point implementation for G.722.1" 9 pp. (2000).
ITU-T, "ITU-T Recommendation G.722.2, Series G: Transmission Systems and Media, Digital Systems and Networks. Digital terminal equipments—Coding of analogue signals by methods other than PCM—Wideband coding of speech at around 16 kbit/s using Adaptive Multi-Rate Wideband (AMR-WB)," 71 pp. (2003).
ITU-T, "ITU-T Recommendation G.722.2 Erratum 1, Series G: Transmission Systems and Media, Digital Systems and Networks. Digital terminal equipments—Coding of analogue signals by methods other than PCM—Wideband coding of speech at around 16 kbit/s using Adaptive Multi-Rate Wideband (AMR-WB)," 1 p. (2004).
ITU-T, "ITU-T Recommendation G.722.2 Annex A, Series G: Transmission Systems and Media, Digital Systems and Networks. Digital terminal equipments—Coding of analogue signals by methods other than PCM—Wideband coding of speech at around 16 kbit/s using Adaptive Multi-Rate Wideband (AMR-WB), Annex A: Comfort noise aspects," 14 pp. (2002).
ITU-T, "ITU-T Recommendation G.722.2 Annex B, Series G: Transmission Systems and Media, Digital Systems and Networks. Digital terminal equipments—Coding of analogue signals by methods other than PCM—Wideband coding of speech at around 16 kbit/s using Adaptive Multi-Rate Wideband (AMR-WB), Annex B: Source Controlled Rate Operation," 13 pp. (2002).
ITU-T, "ITU-T Recommendation G.722.2 Annex B Erratum 1, Series G: Transmission Systems and Media, Digital Systems and Networks. Digital terminal equipments—Coding of analogue signals by methods other than PCM—Wideband coding of speech at around 16 kbit/s using Adaptive Multi-Rate Wideband (AMR-WB), Annex B: Source Controlled Rate Operation," 1 p. (2003).
ITU-T, "ITU-T Recommendation G.722.2 Annex C Erratum 1, Series G: Transmission Systems and Media, Digital Systems and Networks. Digital terminal equipments—Coding of analogue signals by methods other than PCM—Wideband coding of speech at around 16 kbit/s using Adaptive Multi-Rate Wideband (AMR-WB), Annex C: Fixed-point C-code," 2 pp. (2004).
ITU-T, "ITU-T Recommendation G.722.2 Annex D, Series G: Transmission Systems and Media, Digital Systems and Networks. Digital terminal equipments—Coding of analogue signals by methods other than PCM—Wideband coding of speech at around 16 kbit/s using Adaptive Multi-Rate Wideband (AMR-WB), Annex D: Digital test sequences," 13 pp. (2003).
ITU-T, "ITU-T Recommendation G.722.2 Annex E, Series G: Transmission Systems and Media, Digital Systems and Networks. Digital terminal equipments—Coding of analogue signals by methods other than PCM—Wideband coding of speech at around 16 kbit/s using Adaptive Multi-Rate Wideband (AMR-WB), Annex E: Frame Structure," 27 pp. (2002).
ITU-T, "ITU-T Recommendation G.722.2 Annex E Corrigendum 1, Series G: Transmission Systems and Media, Digital Systems and Networks. Digital terminal equipments—Coding of analogue signals by methods other than PCM—Wideband coding of speech at around 16 kbit/s using Adaptive Multi-Rate Wideband (AMR-WB), Annex E: Frame Structure," 1 p. (2003).
ITU-T, "ITU-T Recommendation G.722.2 Annex F, Series G: Transmission Systems and Media, Digital Systems and Networks. Digital terminal equipments—Coding of analogue signals by methods other than PCM—Wideband coding of speech at around 16 kbit/s using Adaptive Multi-Rate Wideband (AMR-WB), Annex F: AMR-WB using in H.245," 10 pp. (2002).
ITU-T, "ITU-T Recommendation G.723.1, General Aspects of Digital Transmission Systems, Dual Rate Speech Coder for Multimedia Communications Transmitting at 5.3 and 6.3 kbit/s," 31 pp. (1996).
ITU-T, "ITU-T Recommendation G.723.1 Annex A, Series G: Transmission Systems and Media, Digital transmission systems—Terminal Equipments—Coding of analogue signals by methods other than PCM, Dual Rate Speech Coder for Multimedia Communications Transmitting at 5.3 and 6.3 kbit/s, Annex A: Silence compression scheme," 21 pp. (1996).
ITU-T, "ITU-T Recommendation G.723.1 Annex B, Series G: Transmission Systems and Media, Digital transmission systems—Terminal Equipments—Coding of analogue signals by methods other than PCM, Dual Rate Speech Coder for Multimedia Communications Transmitting at 5.3 and 6.3 kbit/s, Annex B: Alternative specification based on floating point arithmetic," 8 pp. (1996).
ITU-T, "ITU-T Recommendation G.723.1 Annex C, Series G: Transmission Systems and Media, Digital transmission systems—Terminal Equipments—Coding of analogue signals by methods other than PCM, Dual Rate Speech Coder for Multimedia Communications Transmitting at 5.3 and 6.3 kbit/s, Annex C: Scalable channel coding scheme for wireless applications," 23 pp. (1996).
ITU-T, "ITU-T Recommendation G.728, General Aspects of Digital Transmission Systems; Terminal Equipment Coding of Speech at 16 kbit/s Using Low-Delay Code Excited Linear Prediction," 65 pp. (1992).
ITU-T, "ITU-T Recommendation G.728 Annex G, General Aspects of Digital Transmission Systems; Terminal Equipment Coding of Speech at 16 kbit/s Using Low-Delay Code Excited Linear Prediction, Annex G: 16 kbit/s Fixed Point Specification," 67 pp. (1994).
ITU-T, "ITU-T Recommendation G.728 Annex G Corrigendum 1, Series G: Transmission Systems and Media, Digital Systems and Networks, Digital Transmission Systems; Terminal Equipment Coding of Analogue Signals by methods other than PCM, Coding of speech at 16 kbit/s Using Low-Delay Code Excited Linear Prediction, Annex G: 26 kbit/s Fixed Point Specification—Corrigendum 1," 11 pp. (2000).
ITU-T, "ITU-T Recommendation G.728 Annex H, Series G: Transmission Systems and Media, Digital Systems and Networks, Digital Transmission Systems; Terminal Equipment Coding of Analogue Signals by methods other than PCM, Coding of speech at 16 kbit/s Using Low-Delay Code Excited Linear Prediction, Annex H: Variable bit rate LD-CELP operation mainly for DCME at rates less than 16 kbit/s," 19 pp. (1999).
ITU-T, "ITU-T Recommendation G.728 Annex I, Series G: Transmission Systems and Media, Digital Systems and Networks, Digital Transmission Systems; Terminal Equipment Coding of Analogue Signals by methods other than PCM, Coding of speech at 16 kbit/s Using Low-Delay Code Excited Linear Prediction, Annex I: Frame or packet loss concealment for the LD-CELP decoder," 25 pp. (1999).
ITU-T, "ITU-T Recommendation G.728 Annex J, Series G: Transmission Systems and Media, Digital Systems and Networks, Digital Transmission Systems; Terminal Equipment Coding of Analogue Signals by methods other than PCM, Coding of speech at 16 kbit/s Using Low-Delay Code Excited Linear Prediction, Annex J: Variable bit-rate operation of LD-CELP mainly for voiceband-data applications in DCME," 40 pp. (1999).
ITU-T, "ITU-T Recommendation G.729, Coding of Speech at 8 kbit/s Using Conjugate-Structure Algebraic-Code-Excited Linear-Prediction (CS-ACELP)," 37 pp. (1996).
Johansson et al., "Bandwidth Efficient AMR Operation for VoIP," Proc. IEEE Workshop on Speech Coding, 2002, pp. 150-152 (2002).
Kemp, D.P.; Collura J.S., ; Tremain, T.E., Multi-Frame Coding of LPC Acoustics, Speech, and Signal Processing, Toronto, Ont., Canada, May 14-17, 1991; New York, N.Y. USA, *IEEE*, 1991, vol. 1, pp. 609-612.
Koishida et al., "Enhancing MPEG-4 CELP by Jointly Optimized Inter/Intra-frame LSP Predictors," Proc. IEEE Workshop on Speech Coding, 2000, pp. 90-92 (2000).
Kroon et al., "Quantization Procedures for the Excitation of Celp Coders," CH2396-0/87/0000-1649 IEEE, pp. 1649-1652 (1987).
Kubin et al., "Multiple-Description Coding (MDC) of Speech with an Invertible Auditory Model," Proc. 1999 IEEE Workshop on Speech Coding, pp. 81-83 (1999).
Lakaniemi et al., "AMR and AMR-WB RTP Payload Usage in Packet Switched Conversational Multimedia Services," Proc. IEEE Workshop on Speech Coding, 2002, pp. 147-149 (2002).
Leblanc, W.P., et al., "Efficient Search and Design Procedures for Robust Multi-Stage VQ of LPC Parameters for 4KB/S Speech Coding". In *IEEE Trans. Speech & Audio Processing*, vol. 1, pp. 373-385, (Oct. 1993).
Lefebvre, et al., "High quality coding of wideband audio signals using transform coded excitation (TCS)," Apr. 1994, 1994 IEEE International Conference on Acoustics, Speech, and Signal Processing, vol. 1, pp. I/193-I/196.
Lefebvre et al., "Spectral Amplitude Warping (SAW) for Noise Spectrum Shaping in Audio Coding," IEEE, pp. 335-338 (1997).
Liang, et al., "Adaptive Playout Scheduling and Loss Concealment for Voice Communication Over IP Networks," IEEE Transactions on Multimedia, vol. 5, No. 4, pp. 532-543 (2003).
Makinen et al., "The Effect of Source Based Rate Adaptation Extension in AMR-WB Speech Codec," Proc. IEEE Workshop on Speech Coding, 2002, pp. 153-155 (2002).
McAulay, "Sine-Wave Amplitude Coding at Low Data Rates, Advances in Speech Coding," Kluwer Academic Pub., pp. 203-214, 1991.
McCree, et al., "A 2.4 KBIT/S MELP Coder Candidate for the New U.S. Federal Standard", *1996 IEEE International Conference on Acoustics, Speech, and Signal Processing Conference Proceedings*, Atlanta, GA (Cat. No. 96CH35903), vol. 1, pp. 200-203, May 7-10, 1996.
McCree, A.V., et al., "A Mixed Excitation LPC Vocoder Model for Low Bit Rate Speech Coding", *IEEE Transaction on Speech and Audio Processing*, vol. 3(4):242-250 (Jul. 1995).
Microsoft Corporation, "Using the Windows Media Audio 9 Voice Codec," 4 pp. [Downloaded from the World Wide Web on Feb. 26, 2004.].
Morinaga et al., "The Forward-Backward Recovery Sub-Codec (FB-RSC) Method: A Robust Form of Packet-Loss Concealment for Use in Broadband IP Networks," Proc. IEEE Workshop on Speech Coding, 2002, pp. 62-64 (2002).
Mouy, B. et al., "Nato Stanag 4479: A Standard for an 800 BPS Vocoder and Channel Coding In HF-ECCM System", 1995 International Conference on Acoustics, Speech, and Signal Processing Conference Proceedings, Detroit MI, USA, May 9-12, 1999; New York, NY, USA: *IEEE*, 1995, vol. 1, pp. 480-483.
Mouy, B.M.; De La Noure, P.E., "Voice Transmission at a Very Low Bit Rate on A Noisy Channel: 800 BPS Vocoder with Error Protection to 1200 BPS", *ICASSP-92: 1992 IEEE International Conference on Acoustics, Speech, and Signal*, San Francisco, CA, USA, Mar. 23-26, 1992, New York, NY, USA: IEEE, 1992 vol. 2, pp. 149-152.
Mustapha et al., "An Adaptive Post-Filtering Technique Based on the Modified Yule-Walker Filter," ICASSP-1999, 4 pp. (1999).
Nishiguchi, L.; Iijima, K.; Matsumoto, J., "Harmonic Vector Excitation Coding of Speech at 2.0 KPS", *1997 IEEE Workshop on Speech coding for telecommunication proceedings*, Pocono Manor, PA, USA, Sep. 7-10, 1997, New York, NY, USA,: *IEEE*, 1997, pp. 39-40.
Nomura, T.; Iwadare, M.; Serizawa, M.; Ozawa, K., "a Bitrate and Bandwidth Scalable Celp Coder", *ICASSP 1998 International Conference on Acoustics, Speech, and Signal*, Seattle, WA, USA, May 12-15, 1998, *IEEE*, 1998, vol. 1, pp. 341-344.
Nomura et al., "Voice Over IP Systems with Speech Bitrate Adaptation Based on MPEG-4 Wideband CELP," Proc. 1999 IEEE Workshop on Speech Coding, pp. 132-134 (1999).
Ozawa et al., "Study and Subjective Evaluation on MPEG-4 Narrowband CELP Coding Under Mobile Communication Conditions," Proc. 1999 IEEE Workshop on Speech Coding, pp. 129-131 (1999).
Rahikka et al., "Error Coding Strategies for MELP Vocoder in Wireless and ATM Environments," IEEE Seminar on Speech Coding for Algorithms for Radio Channels, pp. 8/1-8/33 (2000).
Rahikka et al., "Optimized Error Correction of MELP Speech Parameters Via Maximum A Posteriori (MAP) Techniques," Proc. 1999 IEEE Workshop on Speech Coding, pp. 78-80 (1999).
Ramjee et al., "Adaptive Playout Mechanisms for Packetized Audio Applications in Wide-Area Networks," 0743-166X/94 IEEE, pp. 680-688 (1994).
S.A. Ramprashad, "A Multimode Transform Predictive Coder (MTPC) for Speech and Audio," in Proc. IEEE Workshop on Speech Coding, pp. 10-12, 1999.
Salami et al., "The Adaptive Multi-Rate Wideband Codec: History and Performance," Proc. IEEE Workshop on Speech Coding, 2002, pp. 144-146 (2002).
Salami et al., "A robust transformed binary vector excited coder with embedded error-correction coding," IEEE Colloquium on Speech Coding, pp. 5/1-5/6 (1989).
Salami, et al., "A wideband codec at 16/24 kbit/s with 10 ms frames," Sep. 1997, 1997 Workshop on Speech Coding for Telecommunications, pp. 103-104.
Saunders, J., "Real Time Discrimination of Broadcoast Speech/Music," *Proceedings of IEEE International Conference on Acoustics, Speech, and Signal Processing*, vol. 2, pp. 993-996 (May 1996).
Scheirer, E., et al., "Construction and Evaluation of a Robust Multifeature Speech/Music Discriminator," *In Proceedings of IEEE International Conference on Acoustics, Speech, and Signal Processing*, vol. 2, pp. 1331-1334, (Apr. 1997).
J. Schnitzler, J. Eggers, C. Erdmann and P. Vary, "Wideband Speech Coding Using Forward/Backward Adaptive Prediction with Mixed Time/Frequency Domain Excitation," in Proc. IEEE Workshop on Speech Coding, pp. 3-5, 1999.
Schroeder et al., "Code-Excited Linear Prediction (CELP): High-Quality Speech at Very Low Bit Rates," CH2118-8/85/0000-0937 IEEE, pp. 937-940 (1985).
Sreenan et al., "Delay Reduction Techniques for Playout Buffering," IEEE Transactions on Multimedia, vol. 2, No. 2, pp. 88-100 (2000).

Supplee, Lyn M. et al., "MELP: The New Federal Standard at 2400 BPS", *IEEE 1997*, pp. 1591-1594 in lieu of the following which we are unable to obtain *Specification for the Analog to Digital Conversation of Voice by 2,400 Bit/Second Mixed Excitation Linear Prediction FIPS, Draft document of proposed Federal Standard*, dated May 28, 1998.

Swaminathan et al., "A Robust Low Rate Voice Codec for Wireless Communications," Proc. 1997 IEEE Workshop on Speech Coding for Telecommunications, pp. 75-76 (1997).

L. Tancerel, R. Vesa, V.T. Ruoppila and R. Lefebvre, "Combined Speech and Audio Coding by Discrimination," in Proc. IEEE Workshop on Speech Coding, pp. 154-156, 2000.

Tasaki et al., "Post Noise Smoother to Improve Low Bit Rate Speech-Coding Performance," 0-7803-5651-9/99 IEEE, pp. 159-161 (1999).

Tasaki et al., "Spectral Postfilter Design Based on LSP Transformation," 0-7803-4073-6/97 IEEE, pp. 57-58 (1997).

Taumi et al., "13kbps Low-Delay Error-Robust Speech Coding for GSM EFR," 1995 IEEE Workshop on Speech Coding for Telecommunications, pp. 61-62 (1995).

Tzanetakis, G., et al., "Multifeature Audio Segmentation for Browsing and Annotation," *Proc. IEEE Workshop on Applications of Signal Processing to Audio and Acoustics*, New Paltz, NY, pp. 103-106 (Oct. 1999).

Wang et al., "A 1200/2400 BPS Coding Suite Based on MELP," Proc. IEEE Workshop on Speech Coding, 2002, pp. 90-92 (2002).

Wang, Tian et al., "A 1200 BPS Speech Coder Based on MELP", *in Proceedings of the IEEE International Conference on Acoustics, Speech and Signal Processing*, Jun. 2000, pp. 1375-1378.

Wang et al., "Performance Comparison of Intraframe and Interframe LSF Quantization in Packet Networks," Proc. IEEE Workshop on Speech Coding, 2000, pp. 126-128 (2000).

Wang et al., "Wideband Speech Coder Employing T-codes and Reversible Variable Length Codes," Proc. IEEE Workshop on Speech Coding, 2002, pp. 117-119 (2002).

European Search Report for PCT/US06/013010 (EPC Patent Application No. 06749502.8) dated Jun. 8, 2009, 8 pages.

Singapore Written Opinion, Application No. SG 200717476-6, dated Dec. 19, 2008, 4 pages.

Singapore Examination Report, Application No. SG 200717449-3, dated Jul. 1, 2009, 4 pages.

Non-final Office action mailed Oct. 1, 2007, from related U.S. Appl. No. 10/816,466.

Non-final Office action mailed Apr. 8, 2008, from related U.S. Appl. No. 10/816,466.

Non-final Office action mailed Dec. 19, 2008, from related U.S. Appl. No. 10/816,466.

Final Office action mailed May 29, 2009, from related U.S. Appl. No. 10/816,466.

Ellis, D., et al. "Speech/Music Discrimination Based on Posterior Probability Features," *In Proceedings of Eurospeech*, 4 pages, Budapest (1999).

Erdmann et al., "An Adaptive Multi Rate Wideband Speech Codec with Adaptive Gain Re-quantization," Proc. IEEE Workshop on Speech Coding, 2000, pp. 145-147 (2000).

Erhart et al., "A speech packet recovery technique using a model based tree search interpolator," Proc. 1993 IEEE Workshop on Speech Coding for Telecommunications, pp. 77-78 (1993).

Feldbauer et al., "Speech Coding Using Motion Picture Compression Techniques," Proc. IEEE Workshop on Speech Coding, 2002, pp. 47-49 (2002).

Fingscheidt et al., "Joint Speech Codec Parameter and Channel Decoding of Parameter Individual Block Codes (PIBC)," Proc. 1999 IEEE Workshop on Speech Coding, pp. 75-77 (1999).

Fout, "Media Support in the Microsoft Windows Real-Time Communications Client," 6pp. [Downloaded from the World Wide Web on Feb. 26, 2004.].

Gersho, A., "Advances in Speech and Audio Compression", *Proceedings of the IEEE*, vol. 82(6):900-918 (Jun. 1994).

Gersho, A., et al., "Vector Quantization and Signal Compression", Dordrecht, Netherlands,: Kluwer *Academic Publishers,* 1992, xxii+732pp.

Gerson et al., "Vector Sum Excited Linear Prediction (VSELP) Speech Coding at 8 KBPS," CH2847-2/90/0000-0461 IEEE, pp. 461-464 (1990).

Hardwick, J.C.; Lim, J.S., "A 4.8 KBPS Multi-Brand Excitation Speech Coder", *ICASSP* 1988 *International Conference on Acoustics, Speech, and Signal,* New York, NY, USA, Apr. 11-14 1988,: *IEEE,* vol. 1, pp. 374-377.

Heinen et al., "Robust Speech Transmission Over Noisy Channels Employing Non-linear Block Codes," Proc. 1999 IEEE Workshop on Speech Coding, pp. 72-74 (1999).

Houtgast, T., et al., "The Modulation Transfer Function in Room Acoustics As A Predictor or Speech Intelligibility," *Acustica,* vol. 23, pp. 66-73 (1973).

Ikeda et al., "Error-Protected TwinVQ Audio Coding at Less Than 64 kbit/s/ch," Proc. 1995 IEEE Workshop on Speech Coding for Telecommunications, pp. 33-34 (1995).

ITU-T, G.722.1 (Sep. 1999), Series G: Transmission Systems and Media, Digital Systems and Networks, Coding at 24 and 32 kbit/s for hands-free operation in systems with low frame loss.

ITU-T, "ITU-T Recommendation G.728 Annex G Corrigendum 1, Series G: Transmission Systems and Media, Digital Systems and Networks, Digital Transmission Systems; Terminal Equipment Coding of Analogue Signals by methods other than PCM, Coding of speech at 16 kbit/s Using Low-Delay Code Excited Linear Prediction, Annex G: 26 kbit/s Fixed Point Specification — Corrigendum 1," 11 pp. (2000).

ITU-T, "ITU-T Recommendation G.728 Annex H, Series G: Transmission Systems and Media, Digital Systems and Networks, Digital Transmission Systems; Terminal Equipment Coding of Analogue Signals by methods other than PCM, Coding of speech at 16 kbit/s Using Low-Delay Code Excited Linear Prediction, Annex H: Variable bit rate LD-CELP operation mainly for DCME at rates less than 16 kbit/s," 19 pp. (1999).

ITU-T, "ITU-T Recommendation G.728 Annex I, Series G: Transmission Systems and Media, Digital Systems and Networks, Digital Transmission Systems; Terminal Equipment Coding of Analogue Signals by methods other than PCM, Coding of speech at 16 kbit/s Using Low-Delay Code Excited Linear Prediction, Annex I: Frame or packet loss concealment for the LD-CELP decoder," 25 pp. (1999).

ITU-T, "ITU-T Recommendation G.728 Annex 3, Series G: Transmission Systems and Media, Digital Systems and Networks, Digital Transmission Systems, Terminal Equipment Coding of Analogue Signals by methods other than PCM, Coding of speech at 16 kbit/s Using Low-Delay Code Excited Linear Prediction, Annex J: Variable bit-rate operation of LD-CELP mainly for voiceband-data applications in DCME," 40 pp. (1999).

ITU-T, "ITU-T Recommendation G.729, Coding of Speech at 8 kbit/s Using Conjugate-Structure Algebraic-Code-Excited Linear-Prediction (CS-ACELP)," 37 pp. (1996).

Johansson et al., "Bandwidth Efficient AMR Operation for VoIP," Proc. IEEE Workshop on Speech Coding, 2002, pp. 150-152 (2002).

Kemp, D.P.; Collura J.S., ; Tremain, T.E., Multi-Frame Coding of LPC Acoustics, Speech, and Signal Processing, Toronto, Ont., Canada, May 14-17, 1991; New York, N.Y. USA, *IEEE*, 1991, vol. 1, pp. 609-612.

Koishida et al., "Enhancing MPEG-4 CELP by Jointly Optimized Inter/Intra-frame LSP Predictors," Proc. IEEE Workshop on Speech Coding, 2000, pp. 90-92 (2000).

Kroon et al., "Quantization Procedures for the Excitation of Celp Coders," CH2396- 0/87/0000-1649 IEEE, pp. 1649-1652 (1987).

Taumi et al., "13kbps Low-Delay Error-Robust Speech Coding for GSM EFR," 1995 IEEE Workshop on Speech Coding for Telecommunications, pp. 61-62 (1995).

Tzanetakis, G., et al., "Multifeature Audio Segmentation for Browsing and Annotation," Proc. *IEEE Workshop on Applications of Signal Processing to Audio and Acoustics*, New Paltz, NY, pp. 103-106 (Oct. 1999).

Wang et al., "A 1200/2400 BPS Coding Suite Based on MELP," Proc. IEEE Workshop on Speech Coding, 2002, pp. 90-92 (2002).

Wang, Tian et al., "A 1200 BPS Speech Coder Based on MELP", *in Proceedings of the IEEE International Conference on Acoustics, Speech and Signal Processing*, Jun. 2000, pp. 1375-1378.

Wang et al., "Performance Comparison of Intraframe and Interframe LSF Quantization in Packet Networks," Proc. IEEE Workshop on Speech Coding, 2000, pp. 126-128 (2000).

Wang et al., "Wideband Speech Coder Employing T-codes and Reversible Variable Length Codes," Proc. IEEE Workshop on Speech Coding, 2002, pp. 117-119 (2002).

European Search Report for PCT/US99/19135 dated Nov. 1, 2000, 3 pp.

Kabal et al., "Adaptive Postfiltering for Enhancement of Noisy Speech in the Frequency Domain," CH 3006-4/91/0000-0312 IEEE, Jun. 11-14, 1991, pp. 312-315.

A. Ubale and A. Gersho, "Multi-Band CELP Wideband Speech Coder," Proc. IEEE Int. Conf. on Acoustics, Speech and Signal Processing, Munich, Apr. 21-24, 1997, pp. 1367-1370.

International Search Report and Written Opinion dated Jan. 29, 2008, for PCT/US06/12641, 10 pages.

* cited by examiner

SUB-BAND VOICE CODEC WITH MULTI-STAGE CODEBOOKS AND REDUNDANT CODING

RELATED APPLICATION INFORMATION

This application is a continuation of U.S. patent application Ser. No. 11/197,914, entitled "Sub-Band Voice Codec with Multi-Stage Codebooks and Redundant Coding," filed Aug. 4, 2005 (now U.S. Pat. No. 7,280,960), which is a continuation of U.S. patent application Ser. No. 11/142,605, also entitled "Sub-Band Voice Codec with Multi-Stage Codebooks and Redundant Coding," filed May 31, 2005 (now U.S. Pat. No. 7,177,804), the disclosures of which are hereby incorporated by reference.

TECHNICAL FIELD

Described tools and techniques relate to audio codecs, and particularly to sub-band coding, codebooks, and/or redundant coding.

BACKGROUND

With the emergence of digital wireless telephone networks, streaming audio over the Internet, and Internet telephony, digital processing and delivery of speech has become commonplace. Engineers use a variety of techniques to process speech efficiently while still maintaining quality. To understand these techniques, it helps to understand how audio information is represented and processed in a computer.

I. Representation of Audio Information in a Computer

A computer processes audio information as a series of numbers representing the audio. A single number can represent an audio sample, which is an amplitude value at a particular time. Several factors affect the quality of the audio, including sample depth and sampling rate.

Sample depth (or precision) indicates the range of numbers used to represent a sample. More possible values for each sample typically yields higher quality output because more subtle variations in amplitude can be represented. An eight-bit sample has 256 possible values, while a 16-bit sample has 65,536 possible values.

The sampling rate (usually measured as the number of samples per second) also affects quality. The higher the sampling rate, the higher the quality because more frequencies of sound can be represented. Some common sampling rates are 8,000, 11,025, 22,050, 32,000, 44,100, 48,000, and 96,000 samples/second (Hz). Table 1 shows several formats of audio with different quality levels, along with corresponding raw bit rate costs.

TABLE 1

Bit rates for different quality audio

| Sample Depth (bits/sample) | Sampling Rate (samples/second) | Channel Mode | Raw Bit Rate (bits/second) |
|---|---|---|---|
| 8 | 8,000 | mono | 64,000 |
| 8 | 11,025 | mono | 88,200 |
| 16 | 44,100 | stereo | 1,411,200 |

As Table 1 shows, the cost of high quality audio is high bit rate. High quality audio information consumes large amounts of computer storage and transmission capacity. Many computers and computer networks lack the resources to process raw digital audio. Compression (also called encoding or coding) decreases the cost of storing and transmitting audio information by converting the information into a lower bit rate form. Compression can be lossless (in which quality does not suffer) or lossy (in which quality suffers but bit rate reduction from subsequent lossless compression is more dramatic). Decompression (also called decoding) extracts a reconstructed version of the original information from the compressed form. A codec is an encoder/decoder system.

II. Speech Encoders and Decoders

One goal of audio compression is to digitally represent audio signals to provide maximum signal quality for a given amount of bits. Stated differently, this goal is to represent the audio signals with the least bits for a given level of quality. Other goals such as resiliency to transmission errors and limiting the overall delay due to encoding/transmission/decoding apply in some scenarios.

Different kinds of audio signals have different characteristics. Music is characterized by large ranges of frequencies and amplitudes, and often includes two or more channels. On the other hand, speech is characterized by smaller ranges of frequencies and amplitudes, and is commonly represented in a single channel. Certain codecs and processing techniques are adapted for music and general audio; other codecs and processing techniques are adapted for speech.

One type of conventional speech codec uses linear prediction to achieve compression. The speech encoding includes several stages. The encoder finds and quantizes coefficients for a linear prediction filter, which is used to predict sample values as linear combinations of preceding sample values. A residual signal (represented as an "excitation" signal) indicates parts of the original signal not accurately predicted by the filtering. At some stages, the speech codec uses different compression techniques for voiced segments (characterized by vocal chord vibration), unvoiced segments, and silent segments, since different kinds of speech have different characteristics. Voiced segments typically exhibit highly repeating voicing patterns, even in the residual domain. For voiced segments, the encoder achieves further compression by comparing the current residual signal to previous residual cycles and encoding the current residual signal in terms of delay or lag information relative to the previous cycles. The encoder handles other discrepancies between the original signal and the predicted, encoded representation using specially designed codebooks.

Many speech codecs exploit temporal redundancy in a signal in some way. As mentioned above, one common way uses long-term prediction of pitch parameters to predict a current excitation signal in terms of delay or lag relative to previous excitation cycles. Exploiting temporal redundancy can greatly improve compression efficiency in terms of quality and bit rate, but at the cost of introducing memory dependency into the codec—a decoder relies on one, previously decoded part of the signal to correctly decode another part of the signal. Many efficient speech codecs have significant memory dependence.

Although speech codecs as described above have good overall performance for many applications, they have several drawbacks. In particular, several drawbacks surface when the speech codecs are used in conjunction with dynamic network resources. In such scenarios, encoded speech may be lost because of a temporary bandwidth shortage or other problems.

A. Narrowband and Wideband Codecs

Many standard speech codecs were designed for narrowband signals with an eight kHz sampling rate. While the eight kHz sampling rate is adequate in many situations, higher sampling rates may be desirable in other situations, such as to represent higher frequencies.

Speech signals with at least sixteen kHz sampling rates are typically called wideband speech. While these wideband codecs may be desirable to represent high frequency speech patterns, they typically require higher bit rates than narrowband codecs. Such higher bit rates may not be feasible in some types of networks or under some network conditions.

B. Inefficient Memory Dependence in Dynamic Network Conditions

When encoded speech is missing, such as by being lost, delayed, corrupted or otherwise made unusable in transit or elsewhere, performance of speech codecs can suffer due to memory dependence upon the lost information. Loss of information for an excitation signal hampers later reconstruction that depends on the lost signal. If previous cycles are lost, lag information may not be useful, as it points to information the decoder does not have. Another example of memory dependence is filter coefficient interpolation (used to smooth the transitions between different synthesis filters, especially for voiced signals). If filter coefficients for a frame are lost, the filter coefficients for subsequent frames may have incorrect values.

Decoders use various techniques to conceal errors due to packet losses and other information loss, but these concealment techniques rarely conceal the errors fully. For example, the decoder repeats previous parameters or estimates parameters based upon correctly decoded information. Lag information can be very sensitive, however, and prior techniques are not particularly effective for concealment.

In most cases, decoders eventually recover from errors due to lost information. As packets are received and decoded, parameters are gradually adjusted toward their correct values. Quality is likely to be degraded until the decoder can recover the correct internal state, however. In many of the most efficient speech codecs, playback quality is degraded for an extended period of time (e.g., up to a second), causing high distortion and often rendering the speech unintelligible. Recovery times are faster when a significant change occurs, such as a silent frame, as this provides a natural reset point for many parameters. Some codecs are more robust to packet losses because they remove inter-frame dependencies. However, such codecs require significantly higher bit rates to achieve the same voice quality as a traditional CELP codec with inter-frame dependencies.

Given the importance of compression and decompression to representing speech signals in computer systems, it is not surprising that compression and decompression of speech have attracted research and standardization activity. Whatever the advantages of prior techniques and tools, however, they do not have the advantages of the techniques and tools described herein.

SUMMARY

In summary, the detailed description is directed to various techniques and tools for audio codecs and specifically to tools and techniques related to sub-band coding, audio codec codebooks, and/or redundant coding. Described embodiments implement one or more of the described techniques and tools including, but not limited to, the following:

In one aspect, a bit stream for an audio signal includes main coded information for a current frame that references a segment of a previous frame to be used in decoding the current frame, and redundant coded information for decoding the current frame. The redundant coded information includes signal history information associated with the referenced segment of the previous frame.

In another aspect, a bit stream for an audio signal includes main coded information for a current coded unit that references a segment of a previous coded unit to be used in decoding the current coded unit, and redundant coded information for decoding the current coded unit. The redundant coded information includes one or more parameters for one or more extra codebook stages to be used in decoding the current coded unit only if the previous coded unit is not available.

In another aspect, a bit stream includes a plurality of coded audio units, and each coded unit includes a field. The field indicates whether the coded unit includes main encoded information representing a segment of the audio signal, and whether the coded unit includes redundant coded information for use in decoding main encoded information.

In another aspect, an audio signal is decomposed into a plurality of frequency sub-bands. Each sub-band is encoded according to a code-excited linear prediction model. The bit stream may include plural coded units each representing a segment of the audio signal, wherein the plural coded units comprise a first coded unit representing a first number of frequency sub-bands and a second coded unit representing a second number of frequency sub-bands, the second number of sub-bands being different from the first number of sub-bands due to dropping of sub-band information for either the first coded unit or the second coded unit. A first sub-band may be encoded according to a first encoding mode, and a second sub-band may be encoded according to a different second encoding mode. The first and second encoding modes can use different numbers of codebook stages. Each sub-band can be encoded separately. Moreover, a real-time speech encoder can process the bit stream, including decomposing the audio signal into the plurality of frequency sub-bands and encoding the plurality of frequency sub-bands. Processing the bit stream may include decoding the plurality of frequency sub-bands and synthesizing the plurality of frequency sub-bands.

In another aspect, a bit stream for an audio signal includes parameters for a first group of codebook stages for representing a first segment of the audio signal, the first group of codebook stages including a first set of plural fixed codebook stages. The first set of plural fixed codebook stages can include a plurality of random fixed codebook stages. The fixed codebook stages can include a pulse codebook stage and a random codebook stage. The first group of codebook stages can further include an adaptive codebook stage. The bit stream can further include parameters for a second group of codebook stages representing a second segment of the audio signal, the second group having a different number of codebook stages from the first group. The number of codebook stages in the first group of codebook stages can be selected based on one or more factors including one or more characteristics of the first segment of the audio signal. The number of codebook stages in the first group of codebook stages can be selected based on one or more factors including network transmission conditions between the encoder and a decoder. The bit stream may include a separate codebook index and a separate gain for each of the plural fixed codebook stages. Using the separate gains can facilitate signal matching and using the separate codebook indices can simplify codebook searching.

In another aspect, a bit stream includes, for each of a plurality of units parameterizable using an adaptive codebook, a field indicating whether or not adaptive codebook parameters are used for the unit. The units may be sub-frames of plural frames of the audio signal. An audio processing tool, such as a real-time speech encoder, may process the bit stream, including determining whether to use the adaptive codebook parameters in each unit. Determining whether to use the adaptive codebook parameters can include determining whether an adaptive codebook gain is above a threshold value. Also, determining whether to use the adaptive codebook parameters can include evaluating one or more characteristics of the frame. Moreover, determining whether to use the adaptive codebook parameters can include evaluating one or more network transmission characteristics between the encoder and a decoder. The field can be a one-bit flag per voiced unit. The field can be a one-bit flag per sub-frame of a voice frame of the audio signal, and the field may not be included for other types of frames.

The various techniques and tools can be used in combination or independently.

Additional features and advantages will be made apparent from the following detailed description of different embodiments that proceeds with reference to the accompanying drawings.

DETAILED DESCRIPTION

Described embodiments are directed to techniques and tools for processing audio information in encoding and decoding. With these techniques the quality of speech derived from a speech codec, such as a real-time speech codec, is improved. Such improvements may result from the use of various techniques and tools separately or in combination.

Such techniques and tools may include coding and/or decoding of sub-bands using linear prediction techniques, such as CELP.

The techniques may also include having multiple stages of fixed codebooks, including pulse and/or random fixed codebooks. The number of codebook stages can be varied to maximize quality for a given bit rate. Additionally, an adaptive codebook can be switched on or off, depending on factors such as the desired bit rate and the features of the current frame or sub-frame.

Moreover, frames may include redundant encoded information for part or all of a previous frame upon which the current frame depends. This information can be used by the decoder to decode the current frame if the previous frame is lost, without requiring the entire previous frame to be sent multiple times. Such information can be encoded at the same bit rate as the current or previous frames, or at a lower bit rate. Moreover, such information may include random codebook information that approximates the desired portion of the excitation signal, rather than an entire re-encoding of the desired portion of the excitation signal.

Although operations for the various techniques are described in a particular, sequential order for the sake of presentation, it should be understood that this manner of description encompasses minor rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

I. Computing Environment

Figure 1:
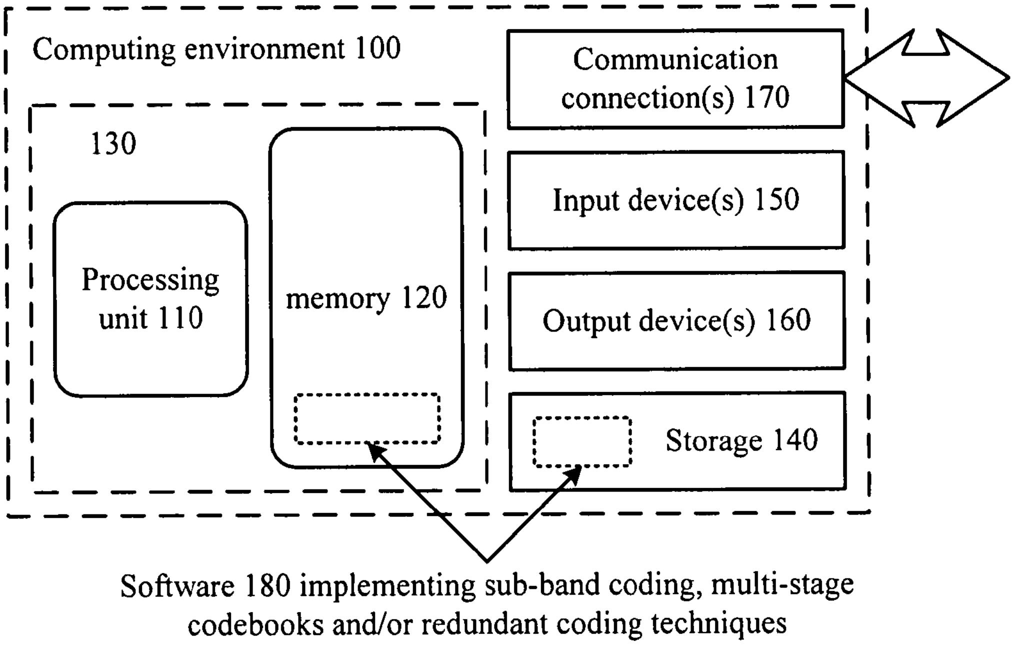
FIG. 1 is a block diagram of a suitable computing environment in which one or more of the described embodiments may be implemented.

FIG. 1 illustrates a generalized example of a suitable computing environment (100) in which one or more of the described embodiments may be implemented. The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing sub-band coding, multi-stage codebooks, and/or redundant coding techniques for a speech encoder or decoder.

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball, a voice input device, a scanning device, network adapter, or another device that provides input to the computing environment (100). For audio, the input device(s) (150) may be a sound card, microphone or other device that accepts audio input in analog or digital form, or a CD/DVD reader that provides audio samples to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. The communication medium conveys information such as computer-executable instructions, compressed speech information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

II. Generalized Network Environment and Real-Time Speech Codec

Figure 2:
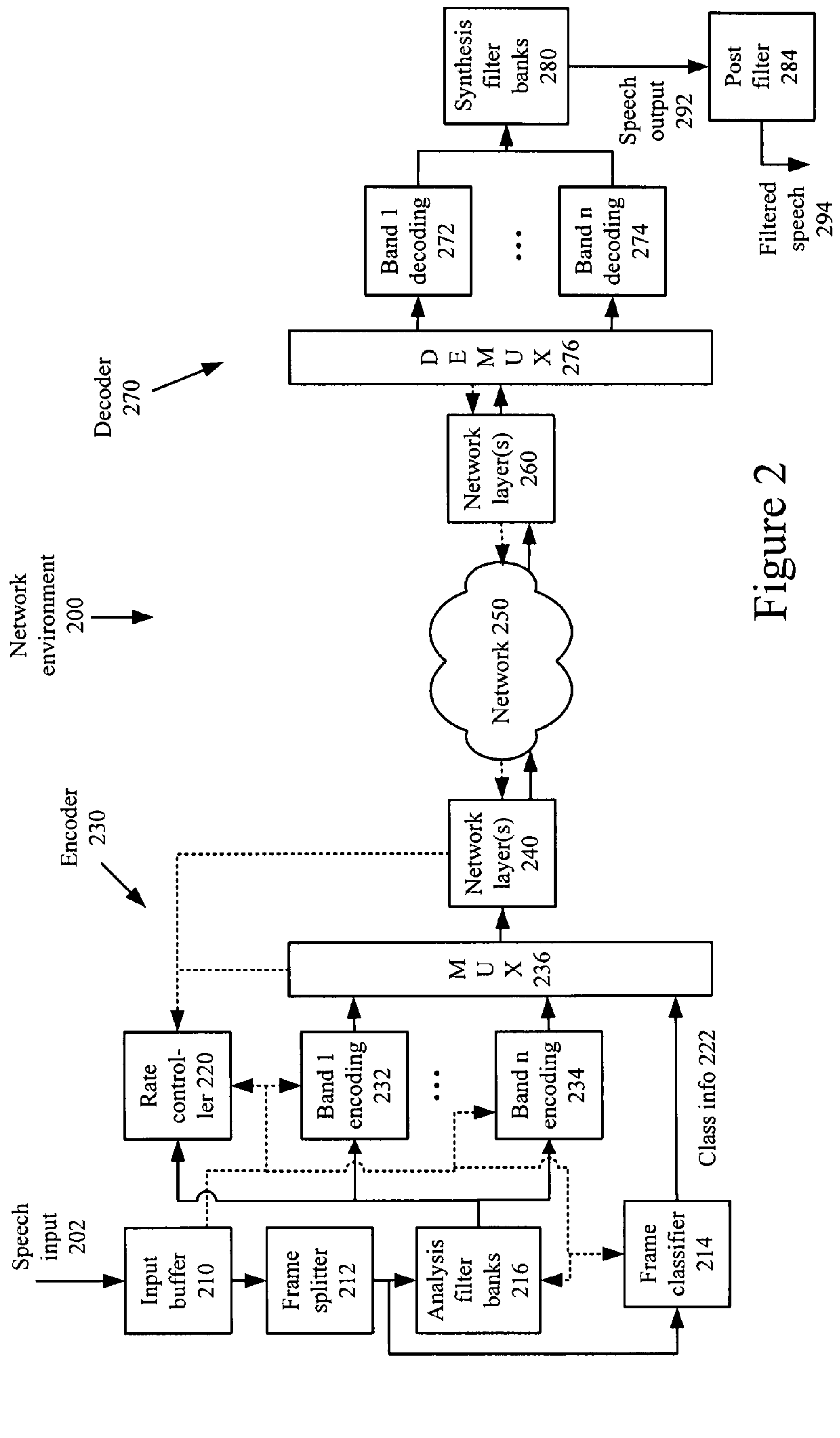
FIG. 2 is a block diagram of a network environment in conjunction with which one or more of the described embodiments may be implemented.

FIG. 2 is a block diagram of a generalized network environment (200) in conjunction with which one or more of the described embodiments may be implemented. A network (250) separates various encoder-side components from various decoder-side components.

The primary functions of the encoder-side and decoder-side components are speech encoding and decoding, respectively. On the encoder side, an input buffer (210) accepts and stores speech input (202). The speech encoder (230) takes speech input (202) from the input buffer (210) and encodes it.

Specifically, a frame splitter (212) splits the samples of the speech input (202) into frames. In one implementation, the frames are uniformly twenty ms long—160 samples for eight kHz input and 320 samples for sixteen kHz input. In other implementations, the frames have different durations, are non-uniform or overlapping, and/or the sampling rate of the input (202) is different. The frames may be organized in a super-frame/frame, frame/sub-frame, or other configuration for different stages of the encoding and decoding.

A frame classifier (214) classifies the frames according to one or more criteria, such as energy of the signal, zero crossing rate, long-term prediction gain, gain differential, and/or other criteria for sub-frames or the whole frames. Based upon the criteria, the frame classifier (214) classifies the different frames into classes such as silent, unvoiced, voiced, and transition (e.g., unvoiced to voiced). Additionally, the frames may be classified according to the type of redundant coding, if any, that is used for the frame. The frame class affects the parameters that will be computed to encode the frame. In addition, the frame class may affect the resolution and loss resiliency with which parameters are encoded, so as to provide more resolution and loss resiliency to more important frame classes and parameters. For example, silent frames typically are coded at very low rate, are very simple to recover by concealment if lost, and may not need protection against loss. Unvoiced frames typically are coded at slightly higher rate, are reasonably simple to recover by concealment if lost, and are not significantly protected against loss. Voiced and transition frames are usually encoded with more bits, depending on the complexity of the frame as well as the presence of transitions. Voiced and transition frames are also difficult to recover if lost, and so are more significantly protected against loss. Alternatively, the frame classifier (214) uses other and/or additional frame classes.

The input speech signal may be divided into sub-band signals before applying an encoding model, such as the CELP encoding model, to the sub-band information for a frame. This may be done using a series of one or more analysis filter banks (such as QMF analysis filters) (216). For example, if a three-band structure is to be used, then the low frequency band can be split out by passing the signal through a low-pass filter. Likewise, the high band can be split out by passing the signal through a high pass filter. The middle band can be split out by passing the signal through a band pass filter, which can include a low pass filter and a high pass filter in series. Alternatively, other types of filter arrangements for sub-band decomposition and/or timing of filtering (e.g., before frame splitting) may be used. If only one band is to be decoded for a portion of the signal, that portion may bypass the analysis filter banks (216). CELP encoding typically has higher coding efficiency than ADPCM and MLT for speech signals.

Figure 3:
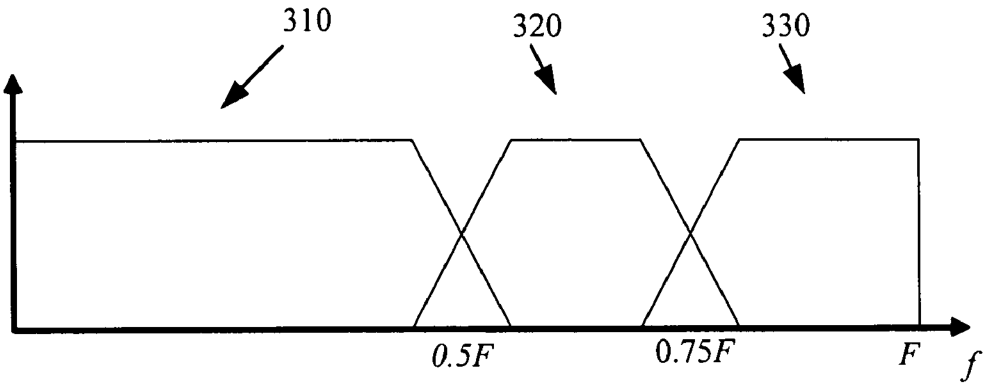
FIG. 3 is a graph depicting a set of frequency responses for a sub-band structure that may be used for sub-band encoding.

The number of bands n may be determined by sampling rate. For example, in one implementation, a single band structure is used for eight kHz sampling rate. For 16 kHz and 22.05 kHz sampling rates, a three-band structure may be used as shown in FIG. 3. In the three-band structure of FIG. 3, the low frequency band (310) extends half the full bandwidth F (from 0 to 0.5 F). The other half of the bandwidth is divided equally between the middle band (320) and the high band (330). Near the intersections of the bands, the frequency response for a band may gradually decrease from the pass level to the stop level, which is characterized by an attenuation of the signal on both sides as the intersection is approached. Other divisions of the frequency bandwidth may also be used. For example, for thirty-two kHz sampling rate, an equally spaced four-band structure may be used.

The low frequency band is typically the most important band for speech signals because the signal energy typically decays towards the higher frequency ranges. Accordingly, the low frequency band is often encoded using more bits than the other bands. Compared to a single band coding structure, the sub-band structure is more flexible, and allows better control of bit distribution/quantization noise across the frequency bands. Accordingly, it is believed that perceptual voice quality is improved significantly by using the sub-band structure.

In FIG. 2, each sub-band is encoded separately, as is illustrated by encoding components (232, 234). While the band encoding components (232, 234) are shown separately, the encoding of all the bands may be done by a single encoder, or they may be encoded by separate encoders. Such band encoding is described in more detail below with reference to FIG. 4. Alternatively, the codec may operate as a single band codec.

The resulting encoded speech is provided to software for one or more networking layers (240) through a multiplexer ("MUX") (236). The networking layers (240) process the encoded speech for transmission over the network (250). For example, the network layer software packages frames of encoded speech information into packets that follow the RTP protocol, which are relayed over the Internet using UDP, IP, and various physical layer protocols. Alternatively, other and/or additional layers of software or networking protocols are used. The network (250) is a wide area, packet-switched network such as the Internet. Alternatively, the network (250) is a local area network or other kind of network.

On the decoder side, software for one or more networking layers (260) receives and processes the transmitted data. The network, transport, and higher layer protocols and software in the decoder-side networking layer(s) (260) usually correspond to those in the encoder-side networking layer(s) (240). The networking layer(s) provide the encoded speech information to the speech decoder (270) through a demultiplexer ("DEMUX") (276). The decoder (270) decodes each of the sub-bands separately, as is depicted in decoding modules (272, 274). All the sub-bands may be decoded by a single decoder, or they may be decoded by separate band decoders.

The decoded sub-bands are then synthesized in a series of one or more synthesis filter banks (such as QMF synthesis filters) (280), which output decoded speech (292). Alternatively, other types of filter arrangements for sub-band synthesis are used. If only a single band is present, then the decoded band may bypass the filter banks (280).

The decoded speech output (292) may also be passed through one or more post filters (284) to improve the quality of the resulting filtered speech output (294). Also, each band may be separately passed through one or more post-filters before entering the filter banks (280).

One generalized real-time speech band decoder is described below with reference to FIG. 6, but other speech decoders may instead be used. Additionally, some or all of the described tools and techniques may be used with other types of audio encoders and decoders, such as music encoders and decoders, or general-purpose audio encoders and decoders.

Aside from these primary encoding and decoding functions, the components may also share information (shown in dashed lines in FIG. 2) to control the rate, quality, and/or loss resiliency of the encoded speech. The rate controller (220) considers a variety of factors such as the complexity of the current input in the input buffer (210), the buffer fullness of output buffers in the encoder (230) or elsewhere, desired output rate, the current network bandwidth, network congestion/noise conditions and/or decoder loss rate. The decoder (270) feeds back decoder loss rate information to the rate controller (220). The networking layer(s) (240, 260) collect or estimate information about current network bandwidth and congestion/noise conditions, which is fed back to the rate controller (220). Alternatively, the rate controller (220) considers other and/or additional factors.

The rate controller (220) directs the speech encoder (230) to change the rate, quality, and/or loss resiliency with which speech is encoded. The encoder (230) may change rate and quality by adjusting quantization factors for parameters or changing the resolution of entropy codes representing the parameters. Additionally, the encoder may change loss resiliency by adjusting the rate or type of redundant coding. Thus, the encoder (230) may change the allocation of bits between primary encoding functions and loss resiliency functions depending on network conditions.

The rate controller (220) may determine encoding modes for each sub-band of each frame based on several factors. Those factors may include the signal characteristics of each sub-band, the bit stream buffer history, and the target bit rate. For example, as discussed above, generally fewer bits are needed for simpler frames, such as unvoiced and silent frames, and more bits are needed for more complex frames, such as transition frames. Additionally, fewer bits may be needed for some bands, such as high frequency bands. Moreover, if the average bit rate in the bit stream history buffer is less than the target average bit rate, a higher bit rate can be used for the current frame. If the average bit rate is less than the target average bit rate, then a lower bit rate may be chosen for the current frame to lower the average bit rate. Additionally, the one or more of the bands may be omitted from one or more frames. For example, the middle and high frequency frames may be omitted for unvoiced frames, or they may be omitted from all frames for a period of time to lower the bit rate during that time.

Figure 4:
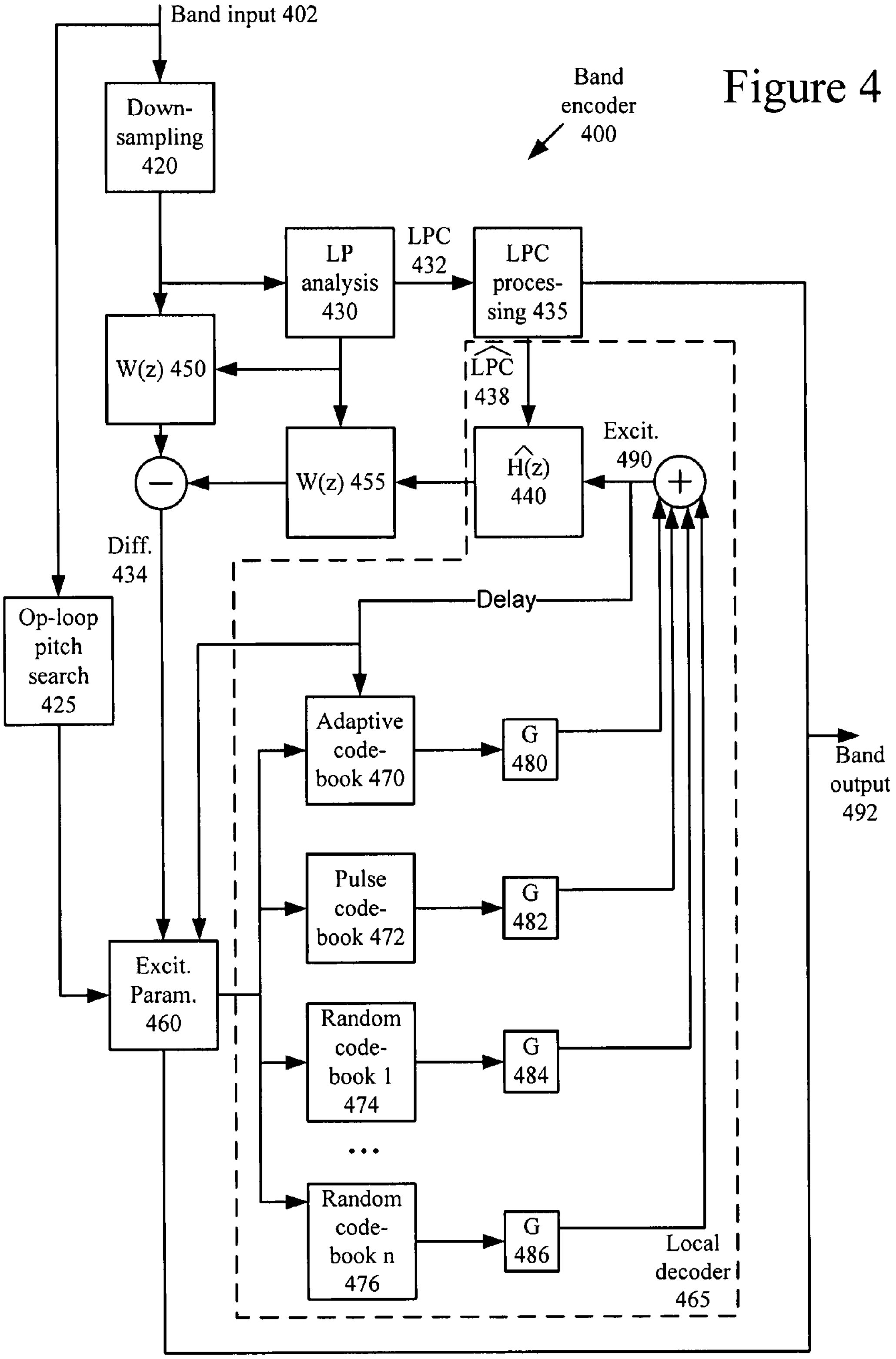
FIG. 4 is a block diagram of a real-time speech band encoder in conjunction with which one or more of the described embodiments may be implemented.

FIG. 4 is a block diagram of a generalized speech band encoder (400) in conjunction with which one or more of the described embodiments may be implemented. The band encoder (400) generally corresponds to any one of the band encoding components (232, 234) in FIG. 2.

The band encoder (400) accepts the band input (402) from the filter banks (or other filters) if signal (e.g., the current frame) is split into multiple bands. If the current frame is not split into multiple bands, then the band input (402) includes samples that represent the entire bandwidth. The band encoder produces encoded band output (492).

If a signal is split into multiple bands, then a downsampling component (420) can perform downsampling on each band. As an example, if the sampling rate is set at sixteen kHz and each frame is twenty ms in duration, then each frame includes 320 samples. If no downsampling were performed and the frame were split into the three-band structure shown in FIG. 3, then three times as many samples (i.e., 320 samples per band, or 960 total samples) would be encoded and decoded for the frame. However, each band can be downsampled. For example, the low frequency band (310) can be downsampled from 320 samples to 160 samples, and each of the middle band (320) and high band (330) can be downsampled from 320 samples to 80 samples, where the bands (310, 320, 330) extend over half, a quarter, and a quarter of the frequency range, respectively. (The degree of downsampling (420) in this implementation varies in relation to the frequency range of the bands (310, 320, 330). However, other implementations are possible. In later stages, fewer bits are typically used for the higher bands because signal energy typically declines toward the higher frequency ranges.) Accordingly, this provides a total of 320 samples to be encoded and decoded for the frame.

It is believed that even with this downsampling of each band, the sub-band codec may produce higher voice quality output than a single-band codec because it is more flexible. For example, it can be more flexible in controlling quantization noise on a per-band basis, rather than using the same approach for the entire frequency spectrum. Each of the multiple bands can be encoded with different properties (such as different numbers and/or types of codebook stages, as discussed below). Such properties can be determined by the rate control discussed above on the basis of several factors, including the signal characteristics of each sub-band, the bit stream buffer history and the target bit rate. As discussed above, typically fewer bits are needed for "simple" frames, such as unvoiced and silent frames, and more bits are needed for "complex" frames, such as transition frames. If the average bit rate in the bit stream history buffer is less than the target average bit rate, a higher bit rate can be used for the current frame. Otherwise a lower bit rate is chosen to lower the average bit rate. In a sub-band codec, each band can be characterized in this manner and encoded accordingly, rather than characterizing the entire frequency spectrum in the same manner. Additionally, the rate control can decrease the bit rate by omitting one or more of the higher frequency bands for one or more frames.

The LP analysis component (430) computes linear prediction coefficients (432). In one implementation, the LP filter uses ten coefficients for eight kHz input and sixteen coefficients for sixteen kHz input, and the LP analysis component (430) computes one set of linear prediction coefficients per frame for each band. Alternatively, the LP analysis component (430) computes two sets of coefficients per frame for each band, one for each of two windows centered at different locations, or computes a different number of coefficients per band and/or per frame.

The LPC processing component (435) receives and processes the linear prediction coefficients (432). Typically, the LPC processing component (435) converts LPC values to a different representation for more efficient quantization and encoding. For example, the LPC processing component (435) converts LPC values to a line spectral pair ["LSP"] representation, and the LSP values are quantized (such as by vector quantization) and encoded. The LSP values may be intra coded or predicted from other LSP values. Various representations, quantization techniques, and encoding techniques are possible for LPC values. The LPC values are provided in some form as part of the encoded band output (492) for packetization and transmission (along with any quantization parameters and other information needed for reconstruction). For subsequent use in the encoder (400), the LPC processing component (435) reconstructs the LPC values. The LPC processing component (435) may perform interpolation for LPC values (such as equivalently in LSP representation or another representation) to smooth the transitions between different sets of LPC coefficients, or between the LPC coefficients used for different sub-frames of frames.

The synthesis (or "short-term prediction") filter (440) accepts reconstructed LPC values (438) and incorporates them into the filter. The synthesis filter (440) receives an excitation signal and produces an approximation of the original signal. For a given frame, the synthesis filter (440) may buffer a number of reconstructed samples (e.g., ten for a ten-tap filter) from the previous frame for the start of the prediction.

The perceptual weighting components (450, 455) apply perceptual weighting to the original signal and the modeled output of the synthesis filter (440) so as to selectively de-emphasize the format structure of speech signals to make the auditory systems less sensitive to quantization errors. The perceptual weighting components (450, 455) exploit psychoacoustic phenomena such as masking. In one implementation, the perceptual weighting components (450, 455) apply weights based on the original LPC values (432) received from the LP analysis component (430). Alternatively, the perceptual weighting components (450, 455) apply other and/or additional weights.

Following the perceptual weighting components (450, 455), the encoder (400) computes the difference between the perceptually weighted original signal and perceptually weighted output of the synthesis filter (440) to produce a difference signal (434). Alternatively, the encoder (400) uses a different technique to compute the speech parameters.

The excitation parameterization component (460) seeks to find the best combination of adaptive codebook indices, fixed codebook indices and gain codebook indices in terms of minimizing the difference between the perceptually weighted original signal and synthesized signal (in terms of weighted mean square error or other criteria). Many parameters are computed per sub-frame, but more generally the parameters may be per super-frame, frame, or sub-frame. As discussed above, the parameters for different bands of a frame or sub-frame may be different. Table 2 shows the available types of parameters for different frame classes in one implementation.

TABLE 2

Parameters for different frame classes

| Frame class | Parameter(s) |
|---|---|
| Silent | Class information; LSP; gain (per frame, for generated noise) |
| Unvoiced | Class information; LSP; pulse, random and gain codebook parameters |
| Voiced | Class information; LSP; adaptive, pulse, random and gain codebook |
| Transition | parameters (per sub-frame) |

In FIG. 4, the excitation parameterization component (460) divides the frame into sub-frames and calculates codebook indices and gains for each sub-frame as appropriate. For example, the number and type of codebook stages to be used, and the resolutions of codebook indices, may initially be determined by an encoding mode, where the mode may be dictated by the rate control component discussed above. A particular mode may also dictate encoding and decoding parameters other than the number and type of codebook stages, for example, the resolution of the codebook indices. The parameters of each codebook stage are determined by optimizing the parameters to minimize error between a target signal and the contribution of that codebook stage to the synthesized signal. (As used herein, the term "optimize" means finding a suitable solution under applicable constraints such as distortion reduction, parameter search time, parameter search complexity, bit rate of parameters, etc., as opposed to performing a full search on the parameter space. Similarly, the term "minimize" should be understood in terms of finding a suitable solution under applicable constraints.) For example, the optimization can be done using a modified mean square error technique. The target signal for each stage is the difference between the residual signal and the sum of the contributions of the previous codebook stages, if any, to the synthesized signal. Alternatively, other optimization techniques may be used.

Figure 5:
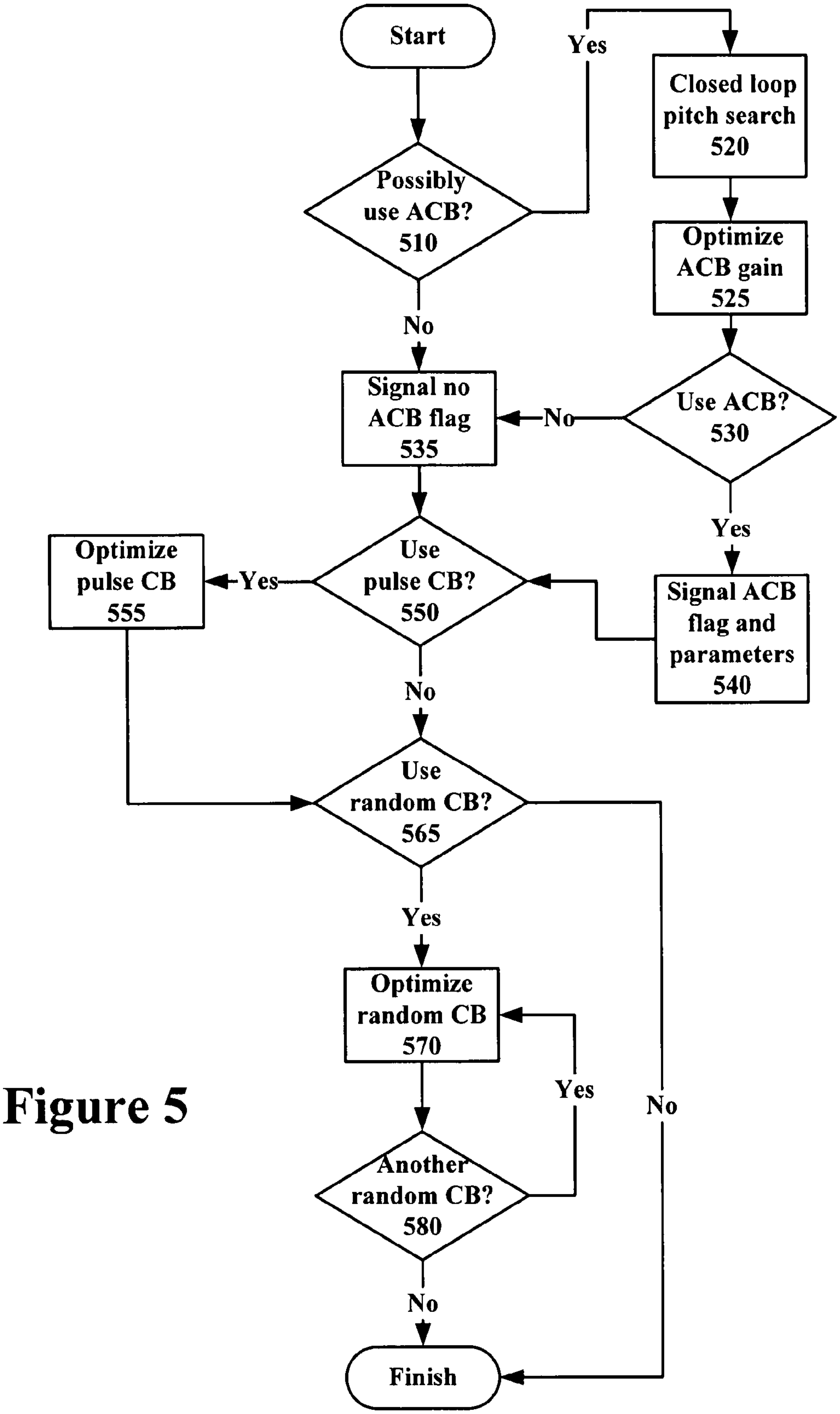
FIG. 5 is a flow diagram depicting the determination of codebook parameters in one implementation.

FIG. 5 shows a technique for determining codebook parameters according to one implementation. The excitation parameterization component (460) performs the technique, potentially in conjunction with other components such as a rate controller. Alternatively, another component in an encoder performs the technique.

Referring to FIG. 5, for each sub-frame in a voiced or transition frame, the excitation parameterization component (460) determines (510) whether an adaptive codebook may be used for the current sub-frame. (For example, the rate control may dictate that no adaptive codebook is to be used for a particular frame.) If the adaptive codebook is not to be used, then an adaptive codebook switch will indicate that no adaptive codebooks are to be used (535). For example, this could be done by setting a one-bit flag at the frame level indicating no adaptive codebooks are used in the frame, by specifying a particular coding mode at the frame level, or by setting a one-bit flag for each sub-frame indicating that no adaptive codebook is used in the sub-frame.

For example, the rate control component may exclude the adaptive codebook for a frame, thereby removing the most significant memory dependence between frames. For voiced frames in particular, a typical excitation signal is characterized by a periodic pattern. The adaptive codebook includes an index that represents a lag indicating the position of a segment of excitation in the history buffer. The segment of previous excitation is scaled to be the adaptive codebook contribution to the excitation signal. At the decoder, the adaptive codebook information is typically quite significant in reconstructing the excitation signal. If the previous frame is lost and the adaptive codebook index points back to a segment of the previous frame, then the adaptive codebook index is typically not useful because it points to non-existent history information. Even if concealment techniques are performed to recover this lost information, future reconstruction will also be based on the imperfectly recovered signal. This will cause the error to continue in the frames that follow because lag information is typically sensitive.

Accordingly, loss of a packet that is relied on by a following adaptive codebook can lead to extended degradation that fades away only after many packets have been decoded, or when a frame without an adaptive codebook is encountered. This problem can be diminished by regularly inserting so called "Intra-frames" into the packet stream that do not have memory dependence between frames. Thus, errors will only propagate until the next intra-frame. Accordingly, there is a trade-off between better voice quality and better packet loss performance because the coding efficiency of the adaptive codebook is usually higher than that of the fixed codebooks. The rate control component can determine when it is advantageous to prohibit adaptive codebooks for a particular frame. The adaptive codebook switch can be used to prevent the use of adaptive codebooks for a particular frame, thereby eliminating what is typically the most significant dependence on previous frames (LPC interpolation and synthesis filter memory may also rely on previous frames to some extent). Thus, the adaptive codebook switch can be used by the rate control component to create a quasi-intra-frame dynamically based on factors such as the packet loss rate (i.e., when the packet loss rate is high, more intra-frames can be inserted to allow faster memory reset).

Referring still to FIG. 5, if an adaptive codebook may be used, then the component (460) determines adaptive codebook parameters. Those parameters include an index, or pitch value, that indicates a desired segment of the excitation signal history, as well as a gain to apply to the desired segment. In FIGS. 4 and 5, the component (460) performs a closed loop pitch search (520). This search begins with the pitch determined by the optional open loop pitch search component (425) in FIG. 4. An open loop pitch search component (425) analyzes the weighted signal produced by the weighting component (450) to estimate its pitch. Beginning with this estimated pitch, the closed loop pitch search (520) optimizes the pitch value to decrease the error between the target signal and the weighted synthesized signal generated from an indicated segment of the excitation signal history. The adaptive codebook gain value is also optimized (525). The adaptive codebook gain value indicates a multiplier to apply to the pitch-predicted values (the values from the indicated segment of the excitation signal history), to adjust the scale of the values. The gain multiplied by the pitch-predicted values is the adaptive codebook contribution to the excitation signal for the current frame or sub-frame. The gain optimization (525) produces a gain value and an index value that minimize the error between the target signal and the weighted synthesized signal from the adaptive codebook contribution.

After the pitch and gain values are determined, then it is determined (530) whether the adaptive codebook contribution is significant enough to make it worth the number of bits used by the adaptive codebook parameters. If the adaptive codebook gain is smaller than a threshold, the adaptive codebook is turned off to save the bits for the fixed codebooks discussed below. In one implementation, a threshold value of 0.3 is used, although other values may alternatively be used as the threshold. As an example, if the current encoding mode uses the adaptive codebook plus a pulse codebook with five pulses, then a seven-pulse codebook may be used when the adaptive codebook is turned off, and the total number of bits will still be the same or less. As discussed above, a one-bit flag for each sub-frame can be used to indicate the adaptive codebook switch for the sub-frame. Thus, if the adaptive codebook is not used, the switch is set to indicate no adaptive codebook is used in the sub-frame (535). Likewise, if the adaptive codebook is used, the switch is set to indicate the adaptive codebook is used in the sub-frame and the adaptive codebook parameters are signaled (540) in the bit stream. Although FIG. 5 shows signaling after the determination, alternatively, signals are batched until the technique finishes for a frame or super-frame.

The excitation parameterization component (460) also determines (550) whether a pulse codebook is used. In one implementation, the use or non-use of the pulse codebook is indicated as part of an overall coding mode for the current frame, or it may be indicated or determined in other ways. A pulse codebook is a type of fixed codebook that specifies one or more pulses to be contributed to the excitation signal. The pulse codebook parameters include pairs of indices and signs (gains can be positive or negative). Each pair indicates a pulse to be included in the excitation signal, with the index indicating the position of the pulse, and the sign indicating the polarity of the pulse. The number of pulses included in the pulse codebook and used to contribute to the excitation signal can vary depending on the coding mode. Additionally, the number of pulses may depend on whether or not an adaptive codebook is being used.

If the pulse codebook is used, then the pulse codebook parameters are optimized (555) to minimize error between the contribution of the indicated pulses and a target signal. If an adaptive codebook is not used, then the target signal is the weighted original signal. If an adaptive codebook is used, then the target signal is the difference between the weighted original signal and the contribution of the adaptive codebook to the weighted synthesized signal. At some point (not shown), the pulse codebook parameters are then signaled in the bit stream.

The excitation parameterization component (460) also determines (565) whether any random fixed codebook stages are to be used. The number (if any) of the random codebook stages is indicated as part of an overall coding mode for the current frame, although it may be indicated or determined in other ways. A random codebook is a type of fixed codebook that uses a pre-defined signal model for the values it encodes. The codebook parameters may include the starting point for an indicated segment of the signal model and a sign that can be positive or negative. The length or range of the indicated segment is typically fixed and is therefore not typically signaled, but alternatively a length or extent of the indicated segment is signaled. A gain is multiplied by the values in the indicated segment to produce the contribution of the random codebook to the excitation signal.

If at least one random codebook stage is used, then the codebook stage parameters for that codebook stage are optimized (570) to minimize the error between the contribution of the random codebook stage and a target signal. The target signal is the difference between the weighted original signal and the sum of the contribution to the weighted synthesized signal of the adaptive codebook (if any), the pulse codebook (if any), and the previously determined random codebook stages (if any). At some point (not shown), the random codebook parameters are then signaled in the bit stream.

The component (460) then determines (580) whether any more random codebook stages are to be used. If so, then the parameters of the next random codebook stage are optimized (570) and signaled as described above. This continues until all the parameters for the random codebook stages have been determined. All the random codebook stages can use the same signal model, although they will likely indicate different segments from the model and have different gain values. Alternatively, different signal models can be used for different random codebook stages.

Each excitation gain may be quantized independently or two or more gains may be quantized together, as determined by the rate controller and/or other components.

While a particular order has been set forth herein for optimizing the various codebook parameters, other orders and optimization techniques may be used. Thus, although FIG. 5 shows sequential computation of different codebook parameters, alternatively, two or more different codebook parameters are jointly optimized (e.g., by jointly varying the parameters and evaluating results according to some non-linear optimization technique). Additionally, other configurations of codebooks or other excitation signal parameters could be used.

The excitation signal in this implementation is the sum of any contributions of the adaptive codebook, the pulse codebook, and the random codebook stage(s). Alternatively, the component (460) may compute other and/or additional parameters for the excitation signal.

Referring to FIG. 4, codebook parameters for the excitation signal are signaled or otherwise provided to a local decoder (465) (enclosed by dashed lines in FIG. 4) as well as to the band output (492). Thus, for each band, the encoder output (492) includes the output from the LPC processing component (435) discussed above, as well as the output from the excitation parameterization component (460).

The bit rate of the output (492) depends in part on the parameters used by the codebooks, and the encoder (400) may control bit rate and/or quality by switching between different sets of codebook indices, using embedded codes, or using other techniques. Different combinations of the codebook types and stages can yield different encoding modes for different frames, bands, and/or sub-frames. For example, an unvoiced frame may use only one random codebook stage. An adaptive codebook and a pulse codebook may be used for a low rate voiced frame. A high rate frame may be encoded using an adaptive codebook, a pulse codebook, and one or more random codebook stages. In one frame, the combination of all the encoding modes for all the sub-bands together may be called a mode set. There may be several pre-defined mode sets for each sampling rate, with different modes corresponding to different coding bit rates. The rate control module can determine or influence the mode set for each frame.

The range of possible bit rates can be quite large for the described implementations, and can produce significant improvements in the resulting quality. In standard encoders, the number of bits that is used for a pulse codebook can also be varied, but too many bits may simply yield pulses that are overly dense. Similarly, when only a single codebook is used, adding more bits could allow a larger signal model to be used. However, this can significantly increase the complexity of searching for optimal segments of the model. In contrast, additional types of codebooks and additional random codebook stages can be added without significantly increasing the complexity of the individual codebook searches (compared to searching a single, combined codebook). Moreover, multiple random codebook stages and multiple types of fixed codebooks allow for multiple gain factors, which provide more flexibility for waveform matching.

Referring still to FIG. 4, the output of the excitation parameterization component (460) is received by codebook reconstruction components (470, 472, 474, 476) and gain application components (480, 482, 484, 486) corresponding to the codebooks used by the parameterization component (460). The codebook stages (470, 472, 474, 476) and corresponding gain application components (480, 482, 484, 486) reconstruct the contributions of the codebooks. Those contributions are summed to produce an excitation signal (490), which is received by the synthesis filter (440), where it is used together with the "predicted" samples from which subsequent linear prediction occurs. Delayed portions of the excitation signal are also used as an excitation history signal by the adaptive codebook reconstruction component (470) to reconstruct subsequent adaptive codebook parameters (e.g., pitch contribution), and by the parameterization component (460) in computing subsequent adaptive codebook parameters (e.g., pitch index and pitch gain values).

Referring back to FIG. 2, the band output for each band is accepted by the MUX (236), along with other parameters. Such other parameters can include, among other information, frame class information (222) from the frame classifier (214) and frame encoding modes. The MUX (236) constructs application layer packets to pass to other software, or the MUX (236) puts data in the payloads of packets that follow a protocol such as RTP. The MUX may buffer parameters so as to allow selective repetition of the parameters for forward error correction in later packets. In one implementation, the MUX (236) packs into a single packet the primary encoded speech information for one frame, along with forward error correction information for all or part of one or more previous frames.

The MUX (236) provides feedback such as current buffer fullness for rate control purposes. More generally, various components of the encoder (230) (including the frame classifier (214) and MUX (236)) may provide information to a rate controller (220) such as the one shown in FIG. 2.

The bit stream DEMUX (276) of FIG. 2 accepts encoded speech information as input and parses it to identify and process parameters. The parameters may include frame class, some representation of LPC values, and codebook parameters. The frame class may indicate which other parameters are present for a given frame. More generally, the DEMUX (276) uses the protocols used by the encoder (230) and extracts the parameters the encoder (230) packs into packets. For packets received over a dynamic packet-switched network, the DEMUX (276) includes a jitter buffer to smooth out short term fluctuations in packet rate over a given period of time. In some cases, the decoder (270) regulates buffer delay and manages when packets are read out from the buffer so as to integrate delay, quality control, concealment of missing frames, etc. into decoding. In other cases, an application layer component manages the jitter buffer, and the jitter buffer is filled at a variable rate and depleted by the decoder (270) at a constant or relatively constant rate.

The DEMUX (276) may receive multiple versions of parameters for a given segment, including a primary encoded version and one or more secondary error correction versions. When error correction fails, the decoder (270) uses concealment techniques such as parameter repetition or estimation based upon information that was correctly received.

Figure 6:
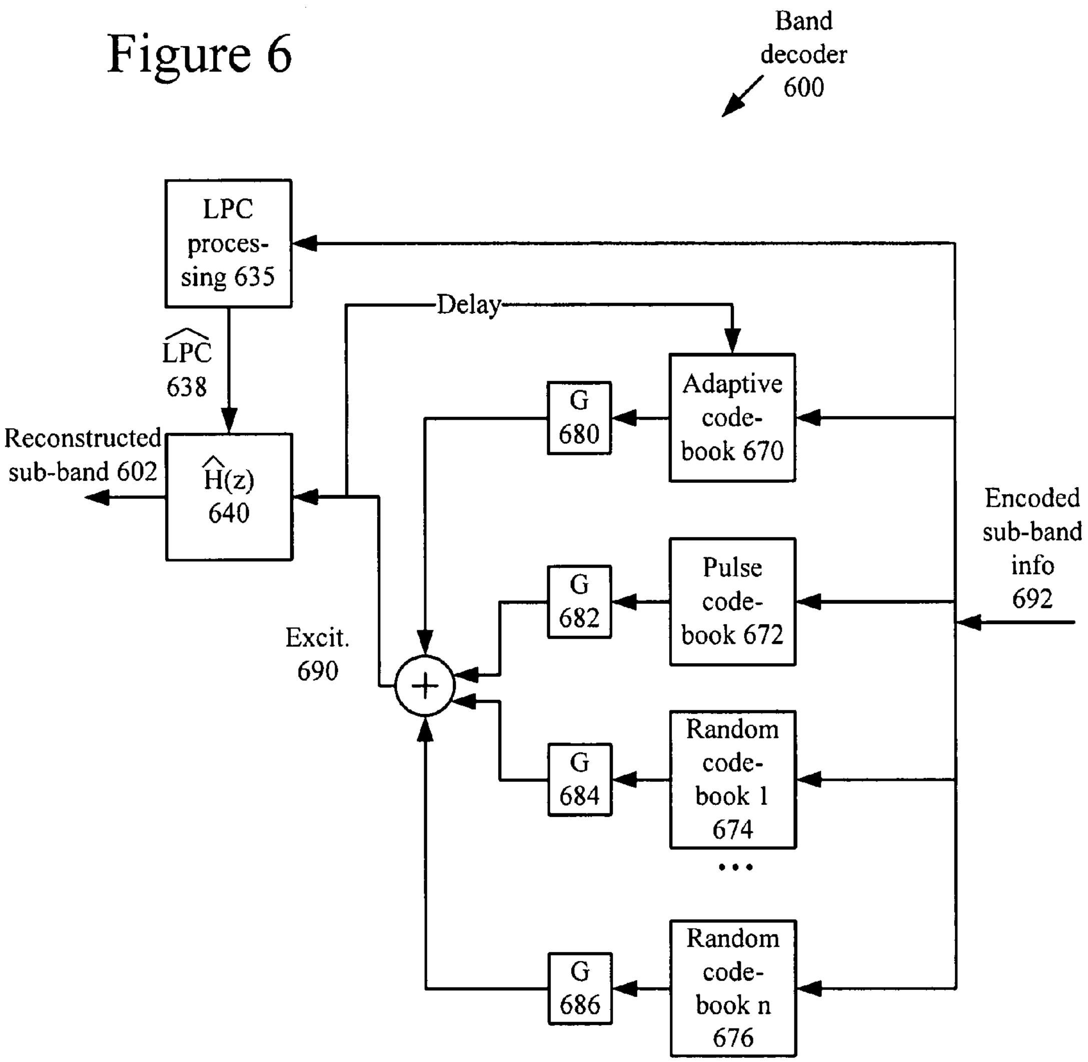
FIG. 6 is a block diagram of a real-time speech band decoder in conjunction with which one or more of the described embodiments may be implemented.

FIG. 6 is a block diagram of a generalized real-time speech band decoder (600) in conjunction with which one or more described embodiments may be implemented. The band decoder (600) corresponds generally to any one of band decoding components (272, 274) of FIG. 2.

The band decoder (600) accepts encoded speech information (692) for a band (which may be the complete band, or one of multiple sub-bands) as input and produces a reconstructed output (602) after decoding. The components of the decoder (600) have corresponding components in the encoder (400), but overall the decoder (600) is simpler since it lacks components for perceptual weighting, the excitation processing loop and rate control.

The LPC processing component (635) receives information representing LPC values in the form provided by the band encoder (400) (as well as any quantization parameters and other information needed for reconstruction). The LPC processing component (635) reconstructs the LPC values (638) using the inverse of the conversion, quantization, encoding, etc. previously applied to the LPC values. The LPC processing component (635) may also perform interpolation for LPC values (in LPC representation or another representation such as LSP) to smooth the transitions between different sets of LPC coefficients.

The codebook stages (670, 672, 674, 676) and gain application components (680, 682, 684, 686) decode the parameters of any of the corresponding codebook stages used for the excitation signal and compute the contribution of each codebook stage that is used. More generally, the configuration and operations of the codebook stages (670, 672, 674, 676) and gain components (680, 682, 684, 686) correspond to the configuration and operations of the codebook stages (470, 472, 474, 476) and gain components (480, 482, 484, 486) in the encoder (400). The contributions of the used codebook stages are summed, and the resulting excitation signal (690) is fed into the synthesis filter (640). Delayed values of the excitation signal (690) are also used as an excitation history by the adaptive codebook (670) in computing the contribution of the adaptive codebook for subsequent portions of the excitation signal.

The synthesis filter (640) accepts reconstructed LPC values (638) and incorporates them into the filter. The synthesis filter (640) stores previously reconstructed samples for processing. The excitation signal (690) is passed through the synthesis filter to form an approximation of the original speech signal. Referring back to FIG. 2, as discussed above, if there are multiple sub-bands, the sub-band output for each sub-band is synthesized in the filter banks (280) to form the speech output (292).

The relationships shown in FIGS. 2-6 indicate general flows of information; other relationships are not shown for the sake of simplicity. Depending on implementation and the type of compression desired, components can be added, omitted, split into multiple components, combined with other components, and/or replaced with like components. For example, in the environment (200) shown in FIG. 2, the rate controller (220) may be combined with the speech encoder (230). Potential added components include a multimedia encoding (or playback) application that manages the speech encoder (or decoder) as well as other encoders (or decoders) and collects network and decoder condition information, and that performs adaptive error correction functions. In alternative embodiments, different combinations and configurations of components process speech information using the techniques described herein.

III. Redundant Coding Techniques

One possible use of speech codecs is for voice over IP networks or other packet-switched networks. Such networks have some advantages over the existing circuit switching infrastructures. However, in voice over IP networks, packets are often delayed or dropped due to network congestion.

Many standard speech codecs have high inter-frame dependency. Thus, for these codecs one lost frame may cause severe voice quality degradation through many following frames.

In other codecs each frame can be decoded independently. Such codecs are robust to packet losses. However the coding efficiency in terms of quality and bit rate drops significantly as a result of disallowing inter-frame dependency. Thus, such codecs typically require higher bit rates to achieve voice quality similar to traditional CELP coders.

In some embodiments, the redundant coding techniques discussed below can help achieve good packet loss recovery performance without significantly increasing bit rate. The techniques can be used together within a single codec, or they can be used separately.

In the encoder implementation described above with reference to FIGS. 2 and 4, the adaptive codebook information is typically the major source of dependence on other frames. As discussed above, the adaptive codebook index indicates the position of a segment of the excitation signal in the history buffer. The segment of the previous excitation signal is scaled (according to a gain value) to be the adaptive codebook contribution of the current frame (or sub-frame) excitation signal. If a previous packet containing information used to reconstruct the encoded previous excitation signal is lost, then this current frame (or sub-frame) lag information is not useful because it points to non-existent history information. Because lag information is sensitive, this usually leads to extended degradation of the resulting speech output that fades away only after many packets have been decoded.

The following techniques are designed to remove, at least to some extent, the dependence of the current excitation signal on reconstructed information from previous frames that are unavailable because they have been delayed or lost.

An encoder such as the encoder (230) described above with reference to FIG. 2 may switch between the following encoding techniques on a frame-by-frame basis or some other basis. A corresponding decoder such as the decoder (270) described above with reference to FIG. 2 switches corresponding parsing/decoding techniques on a frame-by-frame basis or some other basis. Alternatively, another encoder, decoder, or audio processing tool performs one or more of the following techniques.

A. Primary Adaptive Codebook History Re-Encoding/Decoding

In primary adaptive codebook history re-encoding/decoding, the excitation history buffer is not used to decode the excitation signal of the current frame, even if the excitation history buffer is available at the decoder (previous frame's packet received, previous frame decoded, etc.). Instead, at the encoder, the pitch information is analyzed for the current frame to determine how much of the excitation history is needed. The necessary portion of the excitation history is re-encoded and is sent together with the coded information (e.g., filter parameters, codebook indices and gains) for current frame. The adaptive codebook contribution of the current frame references the re-encoded excitation signal that is sent with the current frame. Thus, the relevant excitation history is guaranteed to be available to the decoder for each frame. This redundant coding is not necessary if the current frame does not use an adaptive codebook, such as an unvoiced frame.

The re-encoding of the referenced portion of the excitation history can be done along with the encoding of the current frame, and it can be done in the same manner as the encoding of the excitation signal for a current frame, which is described above.

In some implementations, encoding of the excitation signal is done on a sub-frame basis, and the segment of the re-encoded excitation signal extends from the beginning of the current frame that includes the current sub-frame back to the sub-frame boundary beyond the farthest adaptive codebook dependence for the current frame. The re-encoded excitation signal is thus available for reference with pitch information for multiple sub-frames in the frame. Alternatively, encoding of the excitation signal is done on some other basis, e.g., frame-by-frame.

Figure 7:
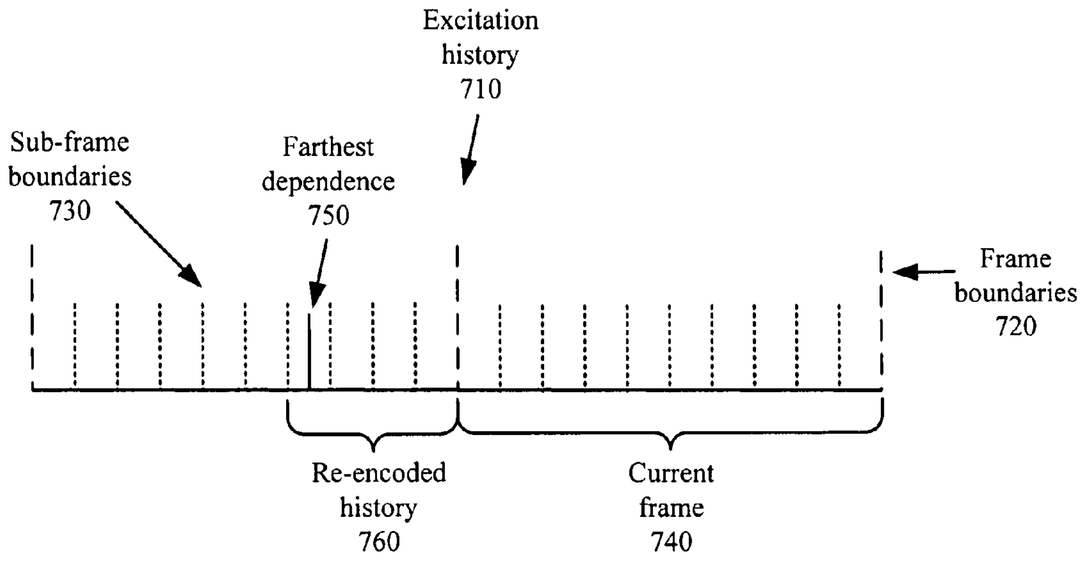
FIG. 7 is a diagram of an excitation signal history, including a current frame and a re-encoded portion of a prior frame.

An example is illustrated in FIG. 7, which depicts an excitation history (710). Frame boundaries (720) and sub-frame boundaries (730) are depicted by larger and smaller dashed lines, respectively. Sub-frames of a current frame (740) are encoded using an adaptive codebook. The farthest point of dependence for any adaptive codebook lag index of a sub-frame of the current frame is depicted by a line (750). Accordingly, the re-encoded history (760) extends from the beginning of the current frame back to the next sub-frame boundary beyond that farthest point (750). The farthest point of dependence can be estimated by using the results of the open loop pitch search (425) described above. Because that search is not precise, however, it is possible that the adaptive codebook will depend on some portion of the excitation signal that is beyond the estimated farthest point unless later pitch searching is constrained. Accordingly, the re-encoded history may include additional samples beyond the estimated farthest dependence point to give additional room for finding matching pitch information. In one implementation, at least ten additional samples beyond the estimated farthest dependence point are included in the re-encoded history. Of course, more than ten samples may be included, so as to increase the likelihood that the re-encoded history extends far enough to include pitch cycles matching those in the current sub-frame.

Alternatively, only the segment(s) of the prior excitation signal actually referenced in the sub-frame(s) of the current frame are re-encoded. For example, a segment of the prior excitation signal having appropriate duration is re-encoded for use in decoding a single current segment of that duration.

Primary adaptive codebook history re-encoding/decoding eliminates the dependence on the excitation history of prior frames. At the same time, it allows adaptive codebooks to be used and does not require re-encoding of the entire previous frame(s) (or even the entire excitation history of the previous frame(s)). However, the bit rate required for re-encoding the adaptive codebook memory is quite high compared to the techniques described below, especially when the re-encoded history is used for primary encoding/decoding at the same quality level as encoding/decoding with inter-frame dependency.

As a by-product of primary adaptive codebook history re-encoding/decoding, the re-encoded excitation signal may be used to recover at least part of the excitation signal for a previous lost frame. For example, the re-encoded excitation signal is reconstructed during decoding of the sub-frames of a current frame, and the re-encoded excitation signal is input to an LPC synthesis filter constructed using actual or estimated filter coefficients.

The resulting reconstructed output signal can be used as part of the previous frame output. This technique can also help to estimate an initial state of the synthesis filter memory for the current frame. Using the re-encoded excitation history and the estimated synthesis filter memory, the output of the current frame is generated in the same manner as normal encoding.

B. Secondary Adaptive Codebook History Re-Encoding/Decoding

In secondary adaptive codebook history re-encoding/decoding, the primary adaptive codebook encoding of the current frame is not changed. Similarly, the primary decoding of the current frame is not changed; it uses the previous frame excitation history if the previous frame is received.

For use if the prior excitation history is not reconstructed, the excitation history buffer is re-encoded in substantially the same way as the primary adaptive codebook history re-encoding/decoding technique described above. Compared to the primary re-encoding/decoding, however, fewer bits are used for re-encoding because the voice quality is not influenced by the re-encoded signal when no packets are lost. The number of bits used to re-encode the excitation history can be reduced by changing various parameters, such as using fewer fixed codebook stages, or using fewer pulses in the pulse codebook.

When the previous frame is lost, the re-encoded excitation history is used in the decoder to generate the adaptive codebook excitation signal for the current frame. The re-encoded excitation history can also be used to recover at least part of the excitation signal for a previous lost frame, as in the primary adaptive codebook history re-encoding/decoding technique.

Also, the resulting reconstructed output signal can be used as part of the previous frame output. This technique may also help to estimate an initial state of the synthesis filter memory for the current frame. Using the re-encoded excitation history and the estimated synthesis filter memory, the output of the current frame is generated in the same manner as normal encoding.

C. Extra Codebook Stage

As in the secondary adaptive codebook history re-encoding/decoding technique, in the extra codebook stage technique the main excitation signal encoding is the same as the normal encoding described above with reference to FIGS. 2-5. However, parameters for an extra codebook stage are also determined.

Figure 8:
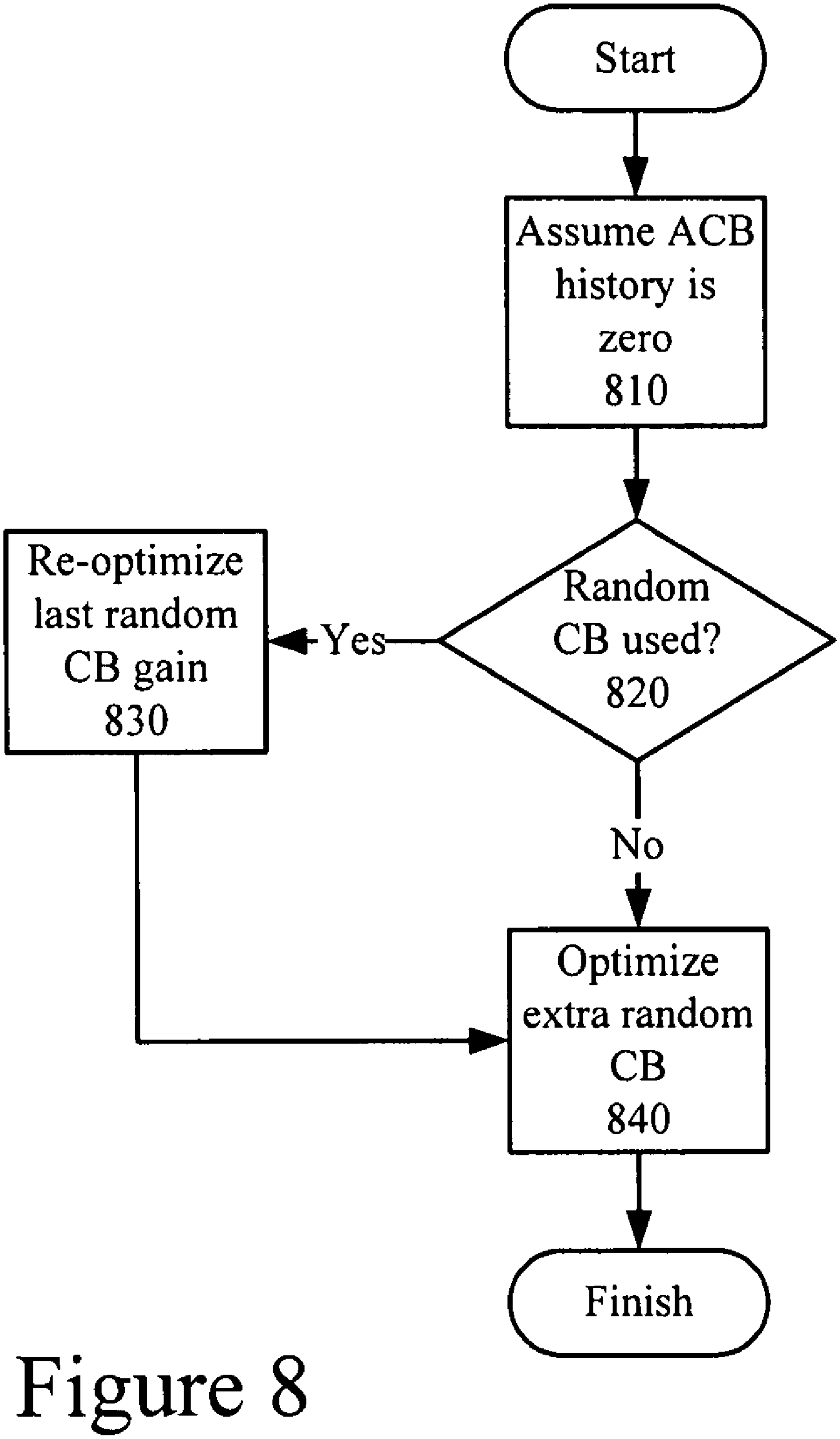
FIG. 8 is flow diagram depicting the determination of codebook parameters for an extra random codebook stage in one implementation.

In this encoding technique, which is illustrated in FIG. 8, it is assumed (810) that the previous excitation history buffer is all zero at the beginning of the current frame, and therefore that there is no contribution from the previous excitation history buffer. In addition to the main encoded information for the current frame, one or more extra codebook stage(s) is used for each sub-frame or other segment that uses an adaptive codebook. For example, the extra codebook stage uses a random fixed codebook such as those described with reference to FIG. 4.

In this technique, a current frame is encoded normally to produce main encoded information (which can include main codebook parameters for main codebook stages) to be used by the decoder if the previous frame is available. At the encoder side, redundant parameters for one or more extra codebook stages are determined in the closed loop, assuming no excitation information from the previous frame. In a first implementation, the determination is done without using any of the main codebook parameters. Alternatively, in a second implementation the determination uses at least some of the main codebook parameters for the current frame. Those main codebook parameters can be used along with the extra codebook stage parameter(s) to decode the current frame if the previous frame is missing, as described below. In general, this second implementation can achieve similar quality to the first implementation with fewer bits being used for the extra codebook stage(s).

According to FIG. 8, the gain of the extra codebook stage and the gain of the last existing pulse or random codebook are jointly optimized in an encoder close-loop search to minimize the coding error. Most of the parameters that are generated in normal encoding are preserved and used in this optimization. In the optimization, it is determined (820) whether any random or pulse codebook stages are used in normal encoding. If so, then a revised gain of the last existing random or pulse codebook stage (such as random codebook stage n in FIG. 4) is optimized (830) to minimize error between the contribution of that codebook stage and a target signal. The target signal for this optimization is the difference between the residual signal and the sum of the contributions of any preceding random codebook stages (i.e., all the preceding codebook stages, but the adaptive codebook contribution from segments of previous frames is set to zero).

The index and gain parameters of the extra random codebook stage are similarly optimized (840) to minimize error between the contribution of that codebook and a target signal. The target signal for the extra random codebook stage is the difference between the residual signal and the sum of the contributions of the adaptive codebook, pulse codebook (if any) and any normal random codebooks (with the last existing normal random or pulse codebook having the revised gain). The revised gain of the last existing normal random or pulse codebook and the gain of the extra random codebook stage may be optimized separately or jointly.

When it is in normal decoding mode, the decoder does not use the extra random codebook stage, and decodes a signal according to the description above (for example, as in FIG. 6).

Figure 9A:
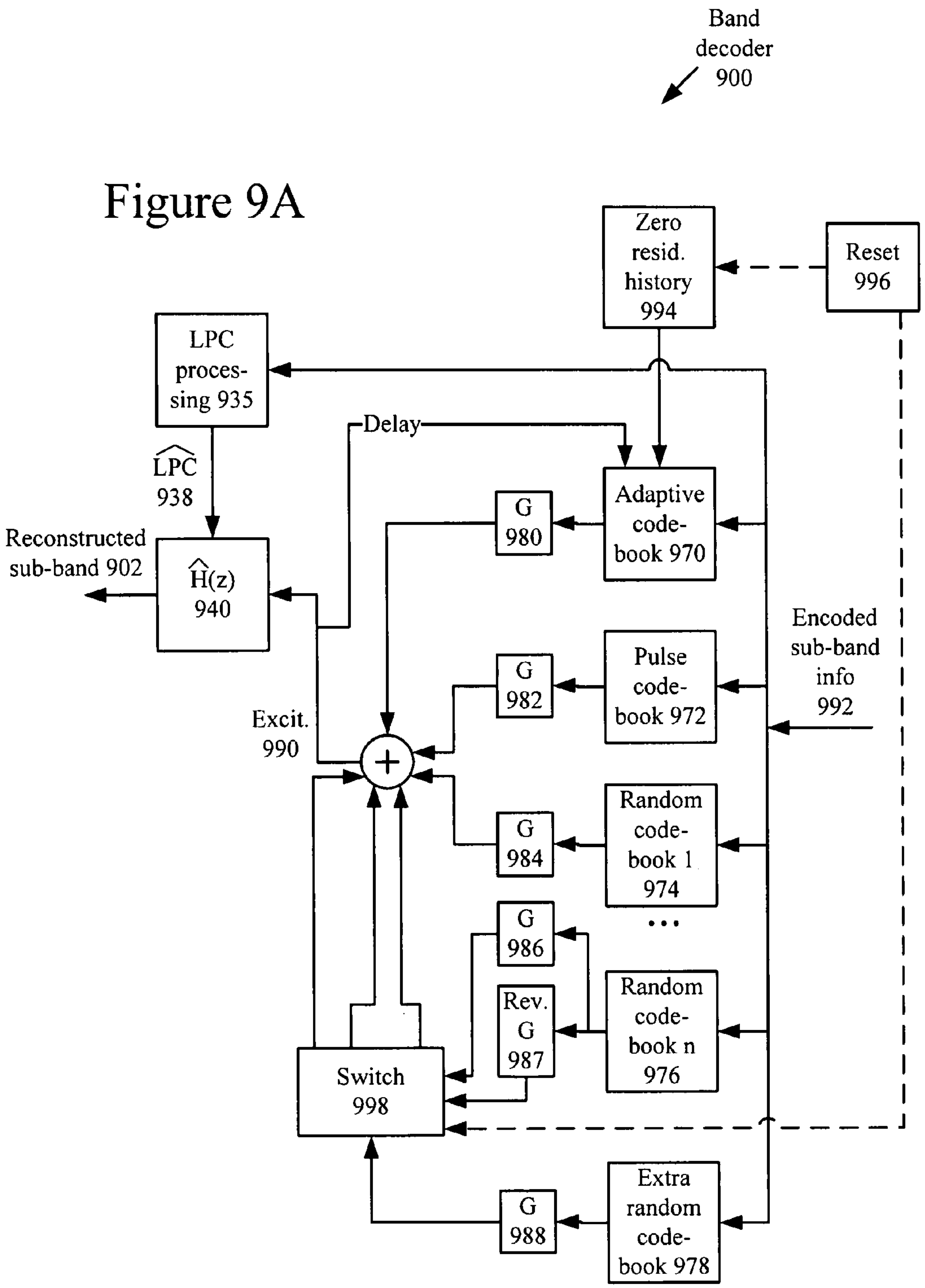
FIG. 9 is a block diagram of a real-time speech band decoder using an extra random codebook stage.

FIG. 9A illustrates a sub-band decoder that may use an extra codebook stage when an adaptive codebook index points to a segment of a previous frame that has been lost. The framework is generally the same as the decoding framework described above and illustrated in FIG. 6, and the functions of many of the components and signals in the sub-band decoder (900) of FIG. 9 are the same as corresponding components and signals of FIG. 6. For example, the encoded sub-band information (992) is received, and the LPC processing component (935) reconstructs the linear prediction coefficients (938) using that information and feeds the coefficients to the synthesis filter (940). When the previous frame is missing, however, a reset component (996) signals a zero history component (994) to set the excitation history to zero for the missing frame and feeds that history to the adaptive codebook (970). The gain (980) is applied to the adaptive codebook's contribution. The adaptive codebook (970) thus has zero contribution when its index points to the history buffer for the missing frame, but may have some non-zero contribution when its index points to a segment inside the current frame. The fixed codebook stages (972, 974, 976) apply their normal indices received with the sub-band information (992). Similarly, the fixed codebook gain components (982, 984), except the last normal codebook gain component (986), apply their normal gains to produce their respective contributions to the excitation signal (990).

If an extra random codebook stage (988) is available and the previous frame is missing, then the reset component (996) signals a switch (998) to pass the contribution of the last normal codebook stage (976) with a revised gain (987) to be summed with the other codebook contributions, rather than passing the contribution of the last normal codebook stage (976) with the normal gain (986) to be summed. The revised gain is optimized for the situation where the excitation history is set to zero for the previous frame. Additionally, the extra codebook stage (978) applies its index to indicate in the corresponding codebook a segment of the random codebook model signal, and the random codebook gain component (988) applies the gain for the extra random codebook stage to that segment. The switch (998) passes the resulting extra codebook stage contribution to be summed with the contributions of the previous codebook stages (970, 972, 974, 976) to produce the excitation signal (990). Accordingly, the redundant information for the extra random codebook stage (such as the extra stage index and gain) and the revised gain of the last main random codebook stage (used in place of the normal gain for the last main random codebook stage) are used to fast reset the current frame to a known status. Alternatively, the normal gain is used for the last main random codebook stage and/or some other parameters are used to signal an extra stage random codebook.

The extra codebook stage technique requires so few bits that the bit rate penalty for its use is typically insignificant. On the other hand, it can significantly reduce quality degradation due to frame loss when inter-frame dependencies are present.

Figure 9B:
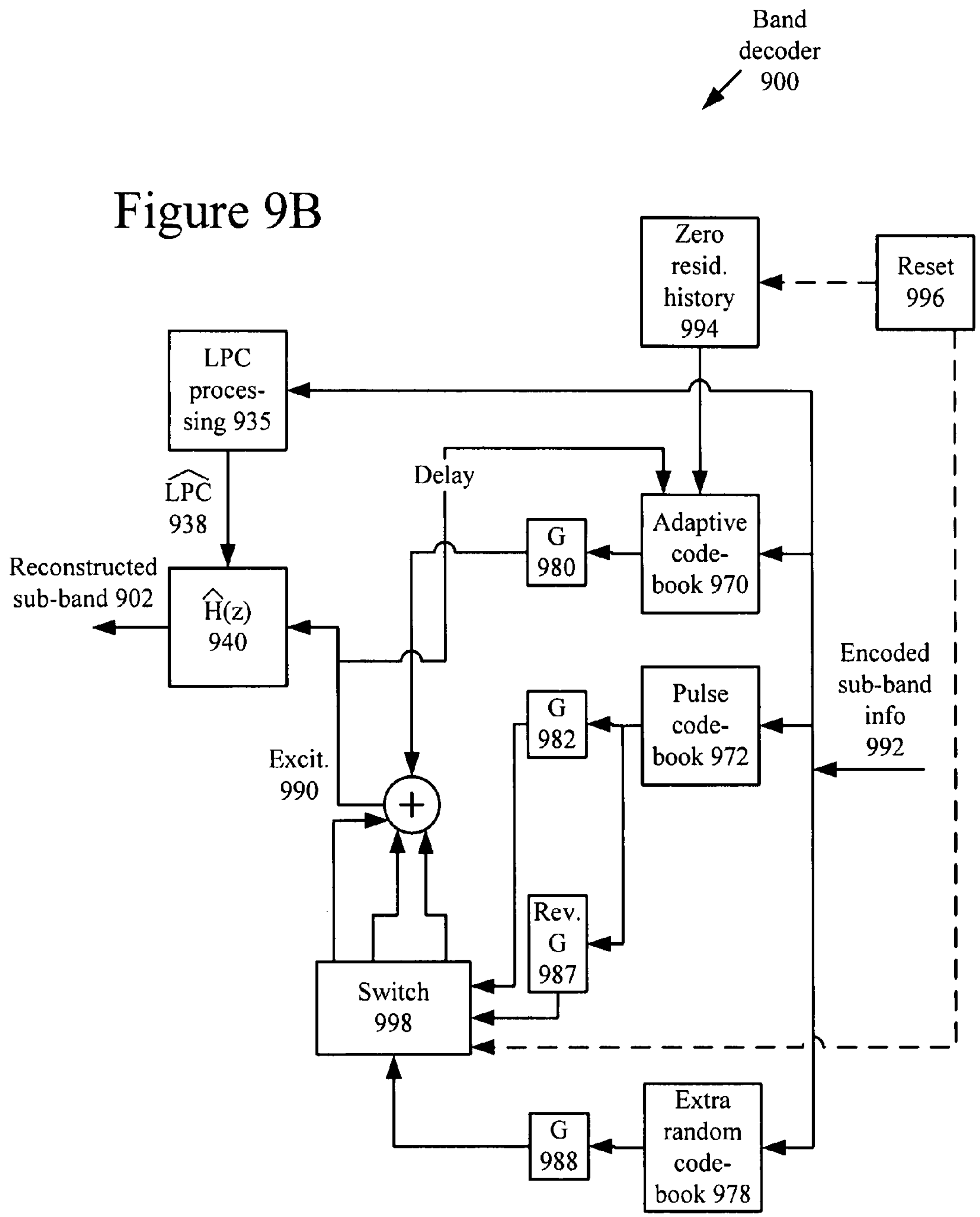

FIG. 9B illustrates a sub-band decoder similar to the one illustrated in FIG. 9A, but with no normal random codebook stages. Thus, in this implementation, the revised gain (987) is optimized for the pulse codebook (972) when the residual history for a previous missing frame is set to zero. Accordingly, when a frame is missing, the contributions of the adaptive codebook (970) (with the residual history for the previous missing frame set to zero), the pulse codebook (972) (with the revised gain), and the extra random codebook stage (978) are summed to produce the excitation signal (990).

An extra stage codebook that is optimized for the situation where the residual history for a missing frame is set to zero may be used with many different implementations and combinations of codebooks and/or other representations of residual signals.

D. Trade-Offs Among Redundant Coding Techniques

Each of the three redundant coding techniques discussed above may have advantages and disadvantages, compared to the others. Table 3 shows some generalized conclusions as to what are believed to be some of the trade-offs among these three redundant coding techniques. The bit rate penalty refers to the amount of bits that are needed to employ the technique. For example, assuming the same bit rate is used as in normal encoding/decoding, a higher bit rate penalty generally corresponds to lower quality during normal decoding because more bits are used for redundant coding and thus fewer bits can be used for the normal encoded information. The efficiency of reducing memory dependence refers to the efficiency of the technique in improving the quality of the resulting speech output when one or more previous frames are lost. The usefulness for recovering previous frame(s) refers to the ability to use the redundantly coded information to recover the one or more previous frames when the previous frame(s) are lost. The conclusions in the table are generalized, and may not apply in particular implementations.

TABLE 3

| Trade-offs Among Redundant Coding Techniques | | | |
|---|---|---|---|
| | Primary ACB History Encoding | Secondary ACB History Encoding | Extra Codebook Stage |
| Bit rate penalty | High | Medium | Low |
| Efficiency of reducing memory dependency | Best | Good | Very Good |
| Usefulness for recovering lost previous frame(s) | Good | Good | None |

The encoder can choose any of the redundant coding schemes for any frame on the fly during encoding. Redundant coding might not be used at all for some classes of frames (e.g., used for voiced frames, not used for silent or unvoiced frames), and if it is used it may be used on each frame, on a periodic basis such as every ten frames, or on some other basis. This can be controlled by a component such as the rate control component, considering factors such as the trade-offs above, the available channel bandwidth, and decoder feedback about packet loss status.

E. Redundant Coding Bit Stream Format

The redundant coding information may be sent in various different formats in a bit stream. Following is an implementation of a format for sending the redundant coded information described above and signaling its presence to a decoder. In this implementation, each frame in the bit stream is started with a two-bit field called frame type. The frame type is used to identify the redundant coding mode for the bits that follow, and it may be used for other purposes in encoding and decoding as well. Table 4 gives the redundant coding mode meaning of the frame type field.

TABLE 4

| Description of Frame Type Bits | |
|---|---|
| Frame Type Bits | Redundant Coding Mode |
| 00 | None (Normal Frame) |
| 01 | Extra Codebook Stage |
| 10 | Primary ACB History Encoding |
| 11 | Secondary ACB History Encoding |

Figure 10:
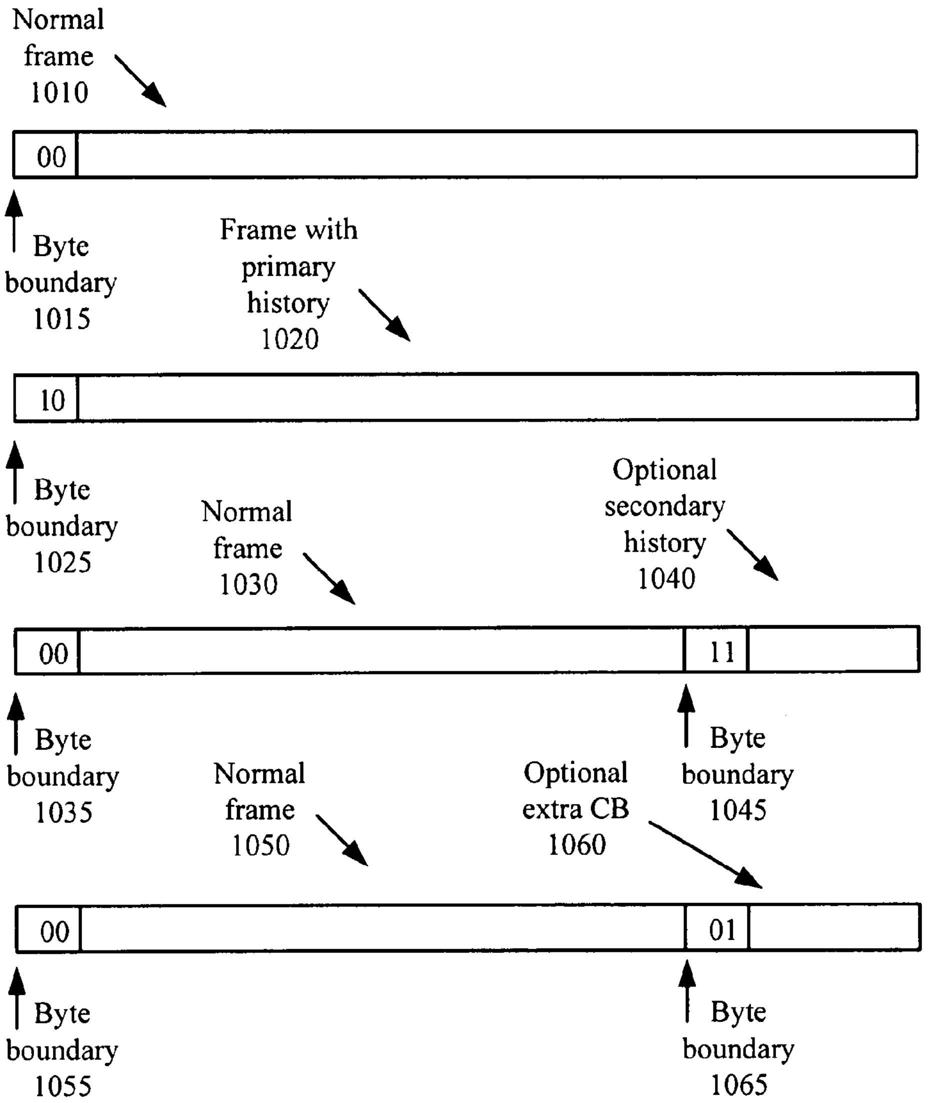
FIG. 10 is a diagram of bit stream formats for frames including information for different redundant coding techniques that may be used with some implementations.

FIG. 10 shows four different combinations of these codes in the bit stream frame format signaling the presence of a normal frame and/or the respective redundant coding types. For a normal frame (1010) including main encoded information for the frame without any redundant coding bits, a byte boundary (1015) at the beginning of the frame is followed by the frame type code 00. The frame type code is followed by the main encoded information for a normal frame.

For a frame (1020) with primary adaptive codebook history redundant coded information, a byte boundary (1025) at the beginning of the frame is followed by the frame type code 10, which signals the presence of primary adaptive codebook history information for the frame. The frame type code is followed by a coded unit for a frame with main encoded information and adaptive codebook history information.

When secondary history redundant coded information is included for a frame (1030), a byte boundary (1035) at the beginning of the frame is followed by a coded unit including a frame type code 00 (the code for a normal frame) followed by main encoded information for a normal frame. However, following the byte boundary (1045) at the end of the main encoded information, another coded unit includes a frame type code 11 that indicates optional secondary history information (1040) (rather than main encoded information for a frame) will follow. Because the secondary history information (1040) is only used if the previous frame is lost, a packetizer or other component can be given the option of omitting the information. This may be done for various reasons, such as when the overall bit rate needs to be decreased, the packet loss rate is low, or the previous frame is included in a packet with the current frame. Or, a demultiplexer or other component can be given the option of skipping the secondary history information when the normal frame (1030) is successfully received.

Similarly, when extra codebook stage redundant coded information is included for a frame (1050), a byte boundary (1055) at the beginning of a coded unit is followed by a frame type code 00 (the code for a normal frame) followed by main encoded information for a normal frame. However, following the byte boundary (1065) at the end of the main encoded information, another coded unit includes a frame type code 01 indicating optional extra codebook stage information (1060) will follow. As with the secondary history information, the extra codebook stage information (1060) is only used if the previous frame is lost. Accordingly, as with the secondary history information, a packetizer or other component can be given the option of omitting the extra codebook stage information, or a demultiplexer or other component can be given the option of skipping the extra codebook stage information.

An application (e.g., an application handling transport layer packetization) may decide to combine multiple frames together to form a larger packet to reduce the extra bits required for the packet headers. Within the packet, the application can determine the frame boundaries by scanning the bit stream.

Figure 11:
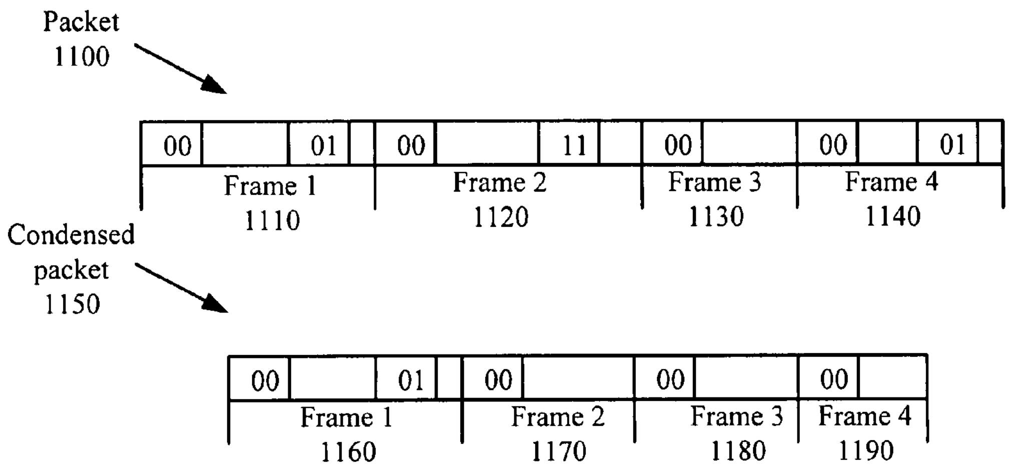
FIG. 11 is a diagram of bit stream formats for packets including frames having redundant coding information that may be used with some implementations.

FIG. 11 shows a possible bit stream of a single packet (1100) having four frames (1110, 1120, 1130, 1140). It may be assumed that all the frames in the single packet will be received if any of them are received (i.e., no partial data corruption), and that the adaptive codebook lag, or pitch, is typically smaller than the frame length. In this example, any optional redundant coding information for Frame 2 (1120), Frame 3 (1130), and Frame 4 (1140) would typically not be used because the previous frame would always be present if the current frame were present. Accordingly, the optional redundant coding information for all but the first frame in the packet (1100) can be removed. This results in the condensed packet (1150), wherein Frame 1 (1160) includes optional extra codebook stage information, but all optional redundant coding information has been removed from the remaining frames (1170, 1180, 1190).

If the encoder is using the primary history redundant coding technique, an application will not drop any such bits when packing frames together into a single packet because the primary history redundant coding information is used whether or not the previous frame is lost. However, the application could force the encoder to encode such a frame as a normal frame if it knows the frame will be in a multi-frame packet, and that it will not be the first frame in such a packet.

Although FIGS. 10 and 11 and the accompanying description show byte-aligned boundaries between frames and types of information, alternatively, the boundaries are not byte aligned. Moreover, FIGS. 10 and 11 and the accompanying description show example frame type codes and combinations of frame types. Alternatively, an encoder and decoder use other and/or additional frame types or combinations of frame types.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method comprising:

at an audio processing tool, processing a bit stream for an audio signal, wherein the bit stream comprises parameters for a first group of codebook stages for representing a first segment of the audio signal, the first group of codebook stages comprising a first set of plural fixed codebook stages, the number of codebook stages in the first group of codebook stages being determined according to a rate controller;

wherein the first set of plural fixed codebook stages comprises a plurality of random fixed codebook stages; and outputting a result.

2. The method of claim 1, wherein the first group of codebook stages further comprises an adaptive codebook stage.

3. The method of claim 1, wherein the bit stream further comprises parameters for a second group of codebook stages representing a second segment of the audio signal, the second group having a different number of codebook stages from the first group.

4. The method of claim 1, wherein the audio processing tool is a real-time speech encoder, and the number of codebook stages in the first group of codebook stages is selected based on one or more factors comprising one or more characteristics of the first segment of the audio signal.

5. The method of claim 1, wherein the audio processing tool is a real-time speech encoder, and the number of codebook stages in the first group of codebook stages is selected based on one or more factors comprising network transmission conditions between the encoder and a decoder.

6. The method of claim 1, wherein the bit stream includes a separate codebook index and a separate gain for each of the plural fixed codebook stages.

7. A method comprising:

at an audio processing tool, processing a bit stream for an audio signal, wherein the bit stream comprises parameters for a first group of codebook stages for representing a first segment of the audio signal, the first group of codebook stages comprising a first set of plural fixed codebook stages, the number of codebook stages in the first group of codebook stages being determined according to a rate controller;

wherein the first set of plural fixed codebook stages comprises a pulse codebook stage and a random codebook stage; and outputting a result.

8. The method of claim 7, wherein the first group of codebook stages further comprises an adaptive codebook stage.

9. The method of claim 7, wherein the bit stream further comprises parameters for a second group of codebook stages representing a second segment of the audio signal, the second group having a different number of codebook stages from the first group.

10. The method of claim 7, wherein the audio processing tool is a real-time speech encoder, and the number of codebook stages in the first group of codebook stages is selected based on one or more factors comprising one or more characteristics of the first segment of the audio signal.

11. The method of claim 7, wherein the audio processing tool is a real-time speech encoder, and the number of codebook stages in the first group of codebook stages is selected based on one or more factors comprising network transmission conditions between the encoder and a decoder.

12. The method of claim 7, wherein the bit stream includes a separate codebook index and a separate gain for each of the plural fixed codebook stages.

13. A method comprising:

at an audio processing tool, processing a bit stream for an audio signal, wherein the bit stream comprises, for each of a plurality of units parameterizable using an adaptive codebook, a field indicating whether or not adaptive codebook parameters are used for the unit, processing the bit stream comprises determining whether to use the adaptive codebook parameters in each unit, and wherein determining whether to use the adaptive codebook parameters comprises determining whether an adaptive codebook gain is above a threshold value; and outputting a result.

14. The method of claim 13, wherein the units are subframes of plural frames of the audio signal.

15. The method of claim 13, wherein the audio processing tool is a real-time speech encoder.

16. A method comprising:

at an audio processing tool, processing a bit stream for an audio signal, wherein the bit stream comprises, for each of a plurality of units parameterizable using an adaptive codebook, a field indicating whether or not adaptive codebook parameters are used for the unit, and the audio processing tool is a real-time speech encoder, processing the bit stream comprises determining whether to use the adaptive codebook parameters in each unit, and wherein determining whether to use the adaptive codebook parameters comprises evaluating one or more network transmission characteristics between the encoder and a decoder; and outputting a result.

* * * * *